_(12)_ United States Patent
Kim et al.

(10) Patent No.: US 11,908,192 B2
(45) Date of Patent: Feb. 20, 2024

(54) ELECTRONIC DEVICE AND CONTROL METHOD THEREFOR

(71) Applicant: SAMSUNG ELECTRONICS CO., LTD., Suwon-si (KR)

(72) Inventors: Donghyun Kim, Suwon-si (KR); Juhyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 662 days.

(21) Appl. No.: 17/058,913

(22) PCT Filed: Mar. 26, 2019

(86) PCT No.: PCT/KR2019/003512
§ 371 (c)(1),
(2) Date: Nov. 25, 2020

(87) PCT Pub. No.: WO2019/231093
PCT Pub. Date: Dec. 5, 2019

(65) Prior Publication Data
US 2021/0216781 A1    Jul. 15, 2021

(30) Foreign Application Priority Data
May 29, 2018    (KR) .......................... 10-2018-0060967

(51) Int. Cl.
*G06V 20/40*      (2022.01)
*G06F 16/75*      (2019.01)
(Continued)

(52) U.S. Cl.
CPC .............. *G06V 20/46* (2022.01); *G06F 16/75* (2019.01); *G06F 16/7837* (2019.01);
(Continued)

(58) Field of Classification Search
CPC . G06T 2207/20084; G06T 2207/20076; G06T 2207/20081; G06T 2207/30242;
(Continued)

(56) References Cited

U.S. PATENT DOCUMENTS 6,973,663 B1    12/2005   Brown et al.
7,555,149 B2     6/2009   Peker et al.
(Continued)

FOREIGN PATENT DOCUMENTS

EP    3021233    5/2016
EP    3118772    1/2017
(Continued)

OTHER PUBLICATIONS

Rejection Decision dated Jan. 25, 2023 for Korean Patent Application No. 10-2018-0060967.
(Continued)

*Primary Examiner* — Dung Hong
(74) *Attorney, Agent, or Firm* — STAAS & HALSEY LLP

(57) ABSTRACT

An electronic device is disclosed. The electronic device comprises a memory for storing a content, and a processor for: acquiring a probability value for each of a plurality of objects included in each of a plurality of frames configuring the stored content; grouping the plurality of objects into at least one group according to a correlation value between the plurality of objects, the correlation value being obtained on the basis of the acquired probability value; counting, for each of a plurality of frames for each group, a case where the acquired probability value is equal to or greater than a preconfigured threshold value; and acquiring a summary content on the basis of a result of the counting.

15 Claims, 14 Drawing Sheets

(51) Int. Cl.
*G06F 16/783* (2019.01)
*H04N 21/44* (2011.01)
*H04N 21/8549* (2011.01)

(52) U.S. Cl.
CPC ....... *G06V 20/41* (2022.01); *H04N 21/44008* (2013.01); *H04N 21/8549* (2013.01)

(58) Field of Classification Search
CPC ........... G06T 7/00; G06T 7/001; G06T 7/143; G06V 20/46; G06V 20/41; G06V 40/172
See application file for complete search history.

(56) References Cited

U.S. PATENT DOCUMENTS

| | | | |
|---|---|---|---|
| 9,426,411 | B2 | 8/2016 | Jung et al. |
| 9,535,990 | B2 | 1/2017 | Skolicki |
| 9,627,004 | B1 * | 4/2017 | Varadarajan ........... G06V 20/46 |
| 9,654,845 | B2 | 5/2017 | Yoo et al. |
| 9,792,362 | B2 | 10/2017 | Park et al. |
| 10,032,483 | B2 | 7/2018 | Ryu et al. |
| 10,073,910 | B2 | 9/2018 | Baek et al. |
| 2009/0087122 | A1 | 4/2009 | Xu et al. |
| 2009/0164904 | A1 | 6/2009 | Horowitz et al. |
| 2010/0071005 | A1 | 3/2010 | Kusunoki |
| 2011/0115937 | A1 | 5/2011 | Sassa |
| 2011/0243530 | A1 | 10/2011 | Kashima et al. |
| 2011/0274315 | A1 * | 11/2011 | Fan .......................... G06T 7/277 382/103 |
| 2016/0100011 | A1 | 4/2016 | Park |
| 2016/0249116 | A1 | 8/2016 | Harb |
| 2016/0261929 | A1 | 9/2016 | Lee et al. |
| 2017/0040036 | A1 * | 2/2017 | Ryu ..................... G11B 27/031 |
| 2017/0351934 | A1 * | 12/2017 | Ruan ................... G06F 16/5866 |
| 2018/0084310 | A1 * | 3/2018 | Katz ....................... H04H 60/66 |
| 2019/0080176 | A1 * | 3/2019 | Lan ...................... G06V 20/46 |
| 2019/0180111 | A1 * | 6/2019 | Kim ...................... G06V 20/47 |
| 2019/0251364 | A1 * | 8/2019 | Park ...................... G06V 20/47 |

FOREIGN PATENT DOCUMENTS

| | | |
|---|---|---|
| JP | 2001-160057 | 6/2001 |
| JP | 3250467 | 1/2002 |
| JP | 2002-176613 | 6/2002 |
| JP | 2011-107997 | 6/2011 |
| JP | 2012-79354 | 4/2012 |
| JP | 5031312 | 7/2012 |
| JP | 2014-187687 | 10/2014 |
| JP | 2015-32905 | 2/2015 |
| JP | 2016-162423 | 9/2016 |
| JP | 2017-169140 | 9/2017 |
| KR | 10-0642888 | 11/2006 |
| KR | 10-0792016 | 1/2008 |
| KR | 10-1264667 | 5/2013 |
| KR | 10-2014-0060659 | 5/2014 |
| KR | 10-2015-0084567 | 7/2015 |
| KR | 10-2015-0118002 | 10/2015 |
| KR | 10-2016-0041398 | 4/2016 |
| KR | 10-2016-0057864 | 5/2016 |
| KR | 10-2016-0097870 | 8/2016 |
| KR | 10-2017-0007799 | 1/2017 |

OTHER PUBLICATIONS

Office Action dated Jul. 16, 2022 issued by the Korean Patent Office for Korean Patent Application No. 10-2018-0060967.
Extended European Search Report dated Apr. 5, 2019 from European Application No. 19156132.3, 8 pages.
European Examination Report dated Aug. 10, 2020 from European Application No. 19156132.3, 5 pages.
Written Opinion of International Application No. PCT/KR2019/001586, dated May 17, 2019, 7 pages.
International Search Report of International Application No. PCT/KR2019/001586, dated May 17, 2019, 3 pages.
Thomas et al., 'Perceptual synoptic view of pixel, object and semantic based attributes of video', Journal of Visual Communication and Image Respresentation, vol. 38, Issue C, Mar. 16, 2016, pp. 367-377.
Ji et al., 'Video abstraction based on the visual attention model and online clustering', Signal Processing: Image Communication 28, Dec. 1, 2012, pp. 241-253.
Schroff et al.; "FaceNet: A Unified Embedding for Face Recognition and Clustering" in Proceedings of the IEEE Conference on Computer Vision and Pattern Recognition, 2015, pp. 815-823.
Deng et al.; "ImageNet: A large-scale hierarchical image database," in Proceedings of the IEEE Conference on Computer Vision and Pattern Recognition, 2009, 9 pages.
Abu-El-Haija et al.; "YouTube-8M: A Large-Scale Video Classification Benchmark," arXiv:1609.08675v1, Sep. 27, 2016, 10 pages.
"Places2: A Large-Scale Database for Scene Understanding", retrieved from: http://places2.csail.mit.edu/explore.html; Search date: Sep. 19, 2017, Last update date: Sep. 4, 2017, 18 pages.
"SUN Database", retrieved from: https://groups.csail.mit.edu/vision/SUN/ Search date: Sep. 19, 2017, Last updated date: Nov. 9, 2013, 1 page.
Written Opinion of International Application No. PCT/KR2019/003512, dated Jul. 10, 2019, 9 pages.
International Search Report of International Application No. PCT/KR2019/003512, dated Jul. 10, 2019, 4 pages.
Office Action dated Jul. 20, 2023, in Korean Application No. 10-2018-0060967.

* cited by examiner

FIG. 3
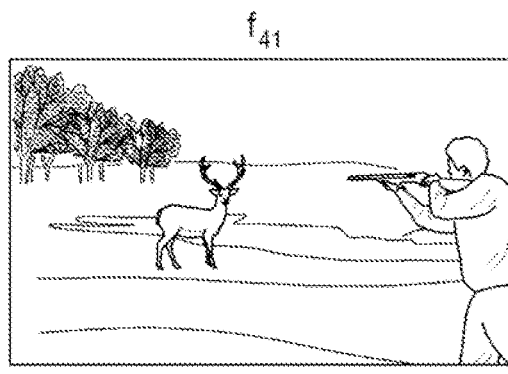
$f_{41}$
41ST FRAME
| OBJECT(l) | PROBABILITY(p) |
|---|---|
| Nature | 0.974 |
| Plant | 0.788 |
| Animal | 0.711 |
| Wildlife | 0.66 |
| Hunting | 0.595 |
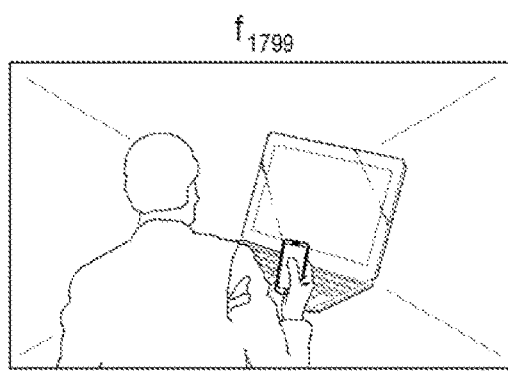
$f_{1799}$
1799TH FRAME
| OBJECT(l) | PROBABILITY(p) |
|---|---|
| Mobile phone | 0.694 |
| Smart phone | 0.603 |
| Gadget | 0.602 |
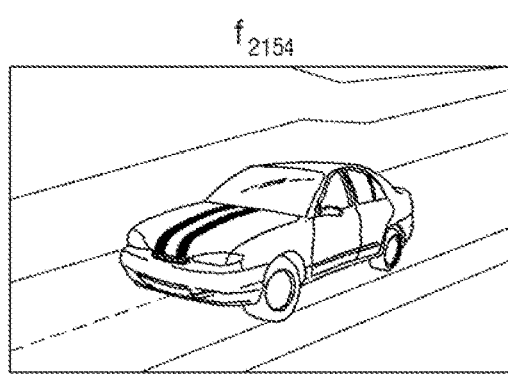
$f_{2154}$
2154TH FRAME
| OBJECT(l) | PROBABILITY(p) |
|---|---|
| Vehicle | 0.999 |
| Car | 0.999 |
| Sports Car | 0.999 |
| Supercar | 0.963 |
| Wheel | 0.853 |
| Motorsports | 0.756 |
| Coupe | 0.744 |
| BMW | 0.694 |
| Sedan | 0.692 |

FIG. 7

| FRAME | OBJECT | | | | |
|---|---|---|---|---|---|
| | a | b | c | d | e |
| 1 | 0.9 | 0.8 | 0.1 | 0.1 | 0.1 |
| 2 | 0.8 | 0.7 | 0.9 | 0.4 | 0.1 |
| 3 | 0.5 | 0.5 | 0.5 | 0.5 | 0.8 |
| 4 | 0.7 | 0.3 | 0.8 | 0.9 | 0.1 |
| 5 | 0.2 | 0.1 | 0.8 | 0.7 | 0 |

| FRAME | OBJECT | | | | | 
|---|---|---|---|---|---|
| | a | b | c | d | e |
| a | - | 0.86 | 0.39 | 0.54 | 0.12 |
| b | - | - | 0.56 | 0.86 | 0.14 |
| c | - | - | - | 0.73 | 0.24 |
| d | - | - | - | - | 0.08 |
| e | - | - | - | - | - |

| | |
|---|---|
| EQUAL TO OR GREATER THAN 0.7 | HIGH CORRELATION |
| 0.3~0.7 | MEDIUM CORRELATION |
| EQUAL TO OR SMALLER THAN 0.3 | LOW CORRELATION |

(a)

GROUPING WHEN RELATION VALUE IS EQUAL TO OR GREATER THAN 0.7

| | GROUP 1 | | GROUP 2 | | GROUP 3 |
|---|---|---|---|---|---|
| | a | b | c | d | e |
| 1 | 0.9 | 0.8 | 0.1 | 0.1 | 0.1 |
| 2 | 0.8 | 0.7 | 0.9 | 0.4 | 0.1 |
| 3 | 0.5 | 0.5 | 0.5 | 0.5 | 0.8 |
| 4 | 0.7 | 0.3 | 0.8 | 0.9 | 0.1 |
| 5 | 0.2 | 0.1 | 0.8 | 0.7 | 0 |

(b)

FIG. 9
|       | GROUP 1 | | GROUP 2 | | GROUP 3 |
|-------|---------|-----|-----|-----|-----|
| FRAME | a | b | c | d | e |
| 1 | 0.9 | 0.8 | 0.1 | 0.1 | 0.1 |
| 2 | 0.8 | 0.7 | 0.9 | 0.4 | 0.1 |
| 3 | 0.5 | 0.5 | 0.5 | 0.5 | 0.8 |
| 4 | 0.7 | 0.3 | 0.8 | 0.9 | 0.1 |
| 5 | 0.2 | 0.1 | 0.8 | 0.7 | 0 |
(a)
GROUPING WHEN PROBABILITY VALUE IS EQUAL TO OR GREATER THAN 0.7
|   | GROUP 1 | GROUP 2 | GROUP 3 |
|---|---------|---------|---------|
| 1 | 2 | 0 | 0 |
| 2 | 2 | 1 | 0 |
| 3 | 0 | 0 | 1 |
| 4 | 1 | 2 | 0 |
| 5 | 0 | 2 | 0 |
(b)
NORMALIZING IN RANGE OF 1 TO 10
|   | GROUP 1 | GROUP 2 | GROUP 3 |
|---|---------|---------|---------|
| 1 | 10 | 0 | 0 |
| 2 | 10 | 5 | 0 |
| 3 | 0 | 0 | 10 |
| 4 | 5 | 10 | 0 |
| 5 | 0 | 10 | 0 |
(c)

FIG. 10
| METHOD FOR USING MAXIMUM VALUE | | | |
|---|---|---|---|
| | GROUP 1 | GROUP 2 | GROUP 3 |
| 1 | 10 | 0 | 0 |
| 2 | 10 | 5 | 0 |
| 3 | 0 | 0 | 10 |
| 4 | 5 | 10 | 0 |
| 5 | 0 | 10 | 0 |
| | REPRESENTATIVE GROUP |
|---|---|
| 1 | GROUP 1 |
| 2 | GROUP 1 |
| 3 | GROUP 3 |
| 4 | GROUP 2 |
| 5 | GROUP 2 |
SELECT GROUP 1
| | REPRESENTATIVE GROUP |
|---|---|
| 1 | GROUP 1 |
| 2 | GROUP 1 |
| 3 | GROUP 3 |
| 4 | GROUP 2 |
| 5 | GROUP 2 |
EXTRACT FRAMES 1 AND 2

FIG. 11
| APPLICATION OF WEIGHT FOR EACH GROUP | | | |
|---|---|---|---|
| | GROUP 1 | GROUP 2 | GROUP 3 |
| 1 | 10 | 0 | 0 |
| 2 | 10 | 5 | 0 |
| 3 | 0 | 0 | 10 |
| 4 | 5 | 10 | 0 |
| 5 | 0 | 10 | 0 |
| | WEIGHT |
|---|---|
| GROUP 1 | 0.7 |
| GROUP 2 | 0.3 |
| GROUP 3 | 0.1 |
APPLY WEIGHT FOR EACH GROUP
| | FINAL VALUE |
|---|---|
| 1 | 7 |
| 2 | 8.5 |
| 3 | 1 |
| 4 | 6.5 |
| 5 | 3 |
EXTRACT FINAL VALUE EQUAL TO OR GREATER THAN 6
| | FINAL VALUE |
|---|---|
| 1 | 7 |
| 2 | 8.5 |
| 3 | 1 |
| 4 | 6.5 |
| 5 | 3 |
EXTRACT FRAMES 1, 2, AND 4

ELECTRONIC DEVICE AND CONTROL METHOD THEREFOR

CROSS-REFERENCE TO RELATED APPLICATIONS

This application is a U.S. National Stage Application which claims the benefit under 35 U.S.C. § 371 of International Patent Application No. PCT/KR2019/003512 filed on Mar. 26, 2019, which claims foreign priority benefit under 35 U.S.C. § 119 of Korean Patent Application 10-2018-0060967 filed on May 29, 2018, in the Korean Intellectual Property Office, the contents of both of which are incorporated herein by reference.

TECHNICAL FIELD

The disclosure relates to an electronic device and a control method therefor, and more particularly relates to an electronic device providing a summary content by analyzing types of marks included in a video content and a control method therefor.

BACKGROUND ART

In the related art, people watched videos, particularly, broadcasting contents, but in recent years, people can easily access various VODs and video streaming services via the Internet using a mobile phone and the like. In addition, recently, with an increase in amount of video contents and diverse viewing methods, users strongly desire to selectively watch a video in accordance with personal interest or concern, instead of receiving a video content in a one-way manner which is the method of the related art.

Accordingly, interest in developing a video summary technology capable of simply and rapidly transferring information regarding a video desired to watch by a user is rapidly increasing. A video service provider provides a video content by editing important or funny scenes from a video as a short video clip to summarize the video content as a preview or a replay.

Various methods are used in order to provide a content by summarizing an original video to a shorter play time than a play time of the original video. Specifically, there is a method for providing a summary content by subjectively editing the original video by an editor using a video editing method by a real person. In addition, there is a method for automatically summarizing a video by a processor instead of the subjective editing by a person, and there are also a method using feature information of a sound and an image and a method for analyzing a narrative structure of a content and a degree of development for each unit.

Meanwhile, in the method for providing a video summary clip by editing a video directly by a service provider, a flow of the content is natural, but a long period of time and a great effort are needed in the editing process, and information preferred by a user may not be provided, because the editing is performed based on a subjective point of view of the editor.

In addition, in the video summary method based on information of a sound and an image of the related art, a scene of a specific person may be shown, but it is difficult to transfer a general content of the video only with the limited information of characters.

Further, in the narrative centered video summary method, it is possible to transfer a brief content of the video, but scenes preferred and desired to watch by a user may be excluded.

DISCLOSURE

Technical Problem

The disclosure is made in view of improvement of above-mentioned problems and an object of the disclosure is to provide an electronic device for grouping objects based on a relation between objects identified in a frame and obtaining a summary content based on the grouping information, and a method for controlling the same.

Technical Solution

In accordance with an embodiment of the disclosure, there is provided an electronic device including a memory storing a content, and a processor configured to obtain a probability value of each of a plurality of objects included in each of a plurality of frames configuring the stored content, group the plurality of objects into at least one group in accordance with a correlation value between the plurality of objects based on the obtained probability value, and count cases where the obtained probability value is equal to or greater than a predetermined threshold value for each of the plurality of frames for each group, and obtain a summary content based on the counted result.

The processor may be configured to obtain the correlation value between the plurality of objects by comparing a difference of the probability values between the plurality of objects for each of the plurality of frames, and group objects having the obtained correlation value equal to or greater than a predetermined threshold value into one group.

The processor may be configured to obtain a main frame for each group based on the counted result and obtain the summary content based on the main frame included in the predetermined group.

The electronic device may further include a display, and the processor may be configured to identify a representative object among objects belonging to each group, control the display to provide information regarding the identified representative object, and based on information regarding a specific object being selected by a user, provide a summary content obtained based on a main frame of a group of the specific object.

The processor may be configured to count the cases where the obtained probability value is equal to or greater than the predetermined threshold value for each of the plurality of frames for each object, and obtain the summary content by identifying objects, the number of times of counting of which for each object is equal to or greater than a predetermined threshold value.

The processor may be configured to normalize the counted result for each group based on the number of objects belonging to each group.

The processor may be configured to apply a weight for each group to the normalized value for each group regarding each of the plurality of frames, and obtain the summary content based on a value applied with the weight.

The processor may be configured to adjust a size of the predetermined threshold value based on a play time of a summary content input in accordance with a user command.

The processor may be configured to, based on a play time of a summary content input in accordance with a user command being longer than a play time of the obtained summary content, update the summary content by adding frames within a predetermined play time range based on a play point of the summary content.

In accordance with another aspect of the disclosure, there is a method for controlling an electronic device storing a content, the method including obtaining a probability value of each of a plurality of objects included in each of a plurality of frames configuring the stored content, grouping the plurality of objects into at least one group in accordance with a correlation value between the plurality of objects based on the obtained probability value, counting cases where the obtained probability value is equal to or greater than a predetermined threshold value for each of the plurality of frames for each group, and obtaining a summary content based on the counted result.

The obtaining the correlation value may include obtaining the correlation value between the plurality of objects by comparing a difference of the probability values between the plurality of objects for each of the plurality of frames, and the grouping may include grouping objects having the obtained correlation value equal to or greater than a predetermined threshold value into one group.

The obtaining the summary content may include obtaining a main frame for each group based on the counted result and obtaining the summary content based on the main frame included in the predetermined group.

The control method of the disclosure may further include identifying a representative object among objects belonging to each group, and providing information regarding the identified representative object, and the obtaining the summary content may include, based on information regarding a specific object being selected by a user, obtaining a summary content obtained based on a main frame of a group of the specific object.

The control method of the disclosure may further include counting the cases where the obtained probability value is equal to or greater than the predetermined threshold value for each of the plurality of frames for each object, and the obtaining the summary content may include obtaining the summary content by identifying objects, the number of times of counting of which for each object is equal to or greater than a predetermined threshold value.

The control method of the disclosure may further include normalizing the counted result for each group based on the number of objects belonging to each group.

The control method of the disclosure may further include applying a weight for each group to the normalized value for each group regarding each of the plurality of frames, and the obtaining the summary content may include obtaining the summary content based on a value applied with the weight.

The obtaining the summary content may include adjusting a size of the predetermined threshold value based on a play time of a summary content input in accordance with a user command.

The control method of the disclosure may further include, based on a play time of a summary content input in accordance with a user command being longer than a play time of the obtained summary content, updating the summary content by adding frames within a predetermined play time range based on a play point of the summary content.

In accordance with still another aspect of the disclosure, there is provided a non-transitory computer readable recording medium storing a computer instruction executed by a processor of an electronic device storing a content to enable the electronic device to perform an operation, in which the operation includes obtaining a plurality of frames from the content, obtaining a probability value of each of a plurality of objects included in each of the plurality of frames configuring the stored content, grouping the plurality of objects into at least one group in accordance with a correlation value between the plurality of objects based on the obtained probability value, counting cases where the obtained probability value is equal to or greater than a predetermined threshold value for each of the plurality of frames for each group; and obtaining a summary content based on the counted result.

DESCRIPTION OF DRAWINGS

FIG. 3 is a view for illustrating an operation of obtaining a probability value from a frame;

FIGS. 7 to 11 are diagrams for illustrating a frame execution process according to an embodiment;

DETAILED DESCRIPTION OF EXEMPLARY EMBODIMENTS

Figure 1:
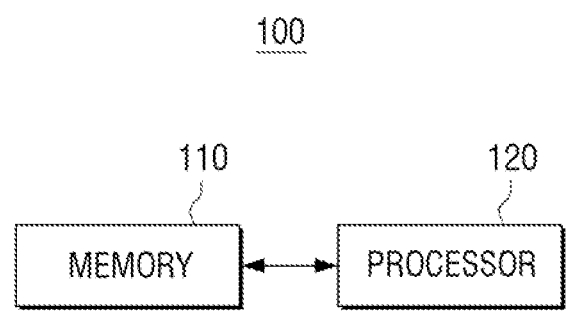
FIG. 1 is a block diagram illustrating an electronic device according to an embodiment.

The disclosure will be described in detail after briefly explaining the way of describing the specification and the drawings.

The terms used in the specification and claims have been selected as general terms as possible in consideration of functions in the embodiments of the disclosure. But, these terms may vary in accordance with the intention of those skilled in the art, the precedent, technical interpretation, the emergence of new technologies and the like. In addition, there are also terms arbitrarily selected by the applicant. Such terms may be interpreted as meanings defined in this specification and may be interpreted based on general content of the specification and common technical knowledge of the technical field, if there are no specific term definitions.

The same reference numerals or symbols in the accompanying drawings in this specification denote parts or components executing substantially the same function. For convenience of description and understanding, the description will be made using the same reference numerals or symbols in different embodiments. That is, although the components with the same reference numerals are illustrated in the plurality of drawings, the plurality of drawings are not illustrating one embodiment.

In addition, terms including ordinals such as "first" or "second" may be used for distinguishing components in the specification and claims. Such ordinals are used for distinguishing the same or similar components and the terms should not be limitedly interpreted due to the use of ordinals.

For example, in regard to components with such ordinals, usage order or arrangement order should not be limitedly interpreted with the numbers thereof. The ordinals may be interchanged, if necessary.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art may be omitted when it is determined that the detailed description may unnecessarily obscure a gist of the disclosure.

The terms "first," "second," or the like may be used for describing various elements but the elements may not be limited by the terms. The terms are used only to distinguish one element from another.

The terms used in the disclosure are merely used to describe specific embodiments and may not be used to limit the scope of other embodiments. Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "module", a "unit", or a "part" in the disclosure is for designating a component executing at least one function or operation, and such a component may be implemented as hardware, software, or a combination of hardware and software. Further, except for when each of a plurality of "modules", "units", "parts" and the like needs to be realized in an individual specific hardware, the components may be integrated in at least one module or chip and be implemented in at least one processor.

In addition, in the embodiments of the disclosure, connection of a certain part to another part may include indirect connection via still another medium, in addition to direct connection. When it is described that a certain part includes another certain part, it implies that a still another part may be further included, rather than excluding it, unless otherwise noted.

FIG. 1 is a block diagram illustrating an electronic device 100 according to an embodiment.

Referring to FIG. 1, the electronic device 100 may include a memory 110 and a processor 120.

The memory 110 may store a content. The content may include a video and an audio signal and may be formed of a plurality of frames. In addition, the memory 110 may store various pieces of information related to the content.

The memory 110 may be implemented as a non-volatile memory, a volatile memory, a flash memory, a hard disk drive (HDD), a solid state drive (SSD), and the like. Meanwhile, the memory 110 may be implemented as an external storage medium, not only the storage medium in the electronic device 100, for example, a micro SD card, a USB memory, a web server via a network, and the like.

The processor 120 may perform general control operations of the electronic device 100.

According to an embodiment, the processor may include one or more of a digital signal processor (DSP), a microprocessor, a Time controller (TCON), a central processing unit (CPU), a Micro Controller Unit (MCU), a micro processing unit (MPU), a controller, an application processor (AP), a communication processor (CP), an ARM processor, and the like or may be defined as the corresponding term. In addition, the processor may be implemented as System on Chip (SoC) or large scale integration (LSI) including the processing algorithm or may be implemented in form of a field programmable gate array (FPGA).

The processor 120 may obtain a plurality of frames from a content and obtain a probability value for each of a plurality of objects from each of a plurality of frames.

Herein, the object may refer to anything which is able to be visually expressed in the frame. The object may include a thing such as a desk, a chair, a phone, and the like and may also include a lecture, class registration, and the like which exist as a concept. Accordingly, the object may be, not only the things, but also a specific concept.

Meanwhile, the object is described as the thing for convenience of description, but there is no limitation thereto. The object may be a specific person. For example, the superman may be identified as one object. In addition, the object may be a main character. The electronic device 100 may recognize a feature of a female main character based on a face shape and set the main character as the object.

Herein, the probability value of the object may refer to a probability that the corresponding object is included in the frame. Various objects may be present in the frame and the electronic device 100 may obtain whether a predetermined specific object is included in each frame as a probability value. For example, with respect to a specific frame, when a probability value of a car object is 0.7, it may imply that a probability that the car object is included in the corresponding frame is 0.7.

The processor 120 may obtain a correlation value between the plurality of objects based on the obtained probability value. The correlation value may refer to a value obtained by digitizing a relation between the plurality of objects. When an interrelationship is high, the correlation value may be high, and when the interrelationship is low, the correlation value may be low. Specifically, the correlation value may refer to a degree that two objects are included in one frame at the same time. For example, when the correlation value of the A and B objects corresponds to 0.8, this may imply a relatively high probability that the A and B objects are included in one frame at the same time.

The reason for obtaining the interrelationship between the plurality of objects based on the probability value of the object as described above is because, if a probability that a plurality of different objects are present in a plurality of frames is high, the corresponding objects may be considered to be interrelated with each other in the corresponding content.

The interrelationship between the plurality of objects may be obtained by various methods and a correlation value may be obtained by obtaining a correlation coefficient as one method thereof.

The correlation coefficient may be a positive or negative number, but the processor 120 according to an embodiment of the disclosure may obtain a correlation value (relation value) by obtaining an absolute value to convert all of the numbers into positive numbers. When the correlation value (relation value) obtained by obtaining the absolute value is equal to or greater than 0.7, the processor 120 may analyze that the objects have a high correlation, and when the correlation value (relation value) is equal to or smaller than 0.3, the processor 120 may analyze that the objects have a low correlation. In addition, in a case of the correlation value (relation value) of 0.3 to 0.7, the processor 120 may analyze that the objects have a medium correlation. Herein, the value, 0.3 or 0.7, may be changed by the user and is merely a value derived through repeated simulation. Accordingly, the above values may be changed with a user's intention or through analysis.

Meanwhile, the processor 120 according to another embodiment of the disclosure may obtain a correlation coefficient without obtaining the absolute value of the correlation coefficient. In this case, the correlation value may be a positive or negative number. In this case, the user may exclude the correlation with the negative number, and analyze only the correlation with the positive number as a high correlation. For example, it is assumed that the correlation coefficients are obtained as 0.8, 0.3, −0.3, and −0.8. The processor 120 may analyze that only the relation corresponding to the value of 0.8 has a high correlation. However, this is merely one of various embodiments and it is not necessary to apply only one analysis method.

In addition, the processor 120 may group the plurality of objects into at least one group based on the obtained correlation value. The processor 120 may group the objects related to each other through the grouping operation to obtain a summary content, and accordingly, the analysis may be easily performed. Specifically, the operation of identifying the object in the frame is the analysis of the probability value. Accordingly, if a summary content is generated only with one object, an accuracy may decrease. However, when the objects are grouped and identified, other objects highly related to a specific object desired by the user may be a target of the summary content, thereby increasing the accuracy.

Further, the processor 120 may count cases where the obtained probability value is equal to or greater than a predetermined threshold value for each of the plurality of frames for each group, and obtain the summary content based on a counted result.

Herein, the processor 120 may obtain a correlation value between the plurality of objects by comparing a difference between probability values of the plurality of objects for each of the plurality of frames, and group the objects having the obtained correlation value equal to or greater than a predetermined threshold value into one group.

Further, the processor 120 may obtain a main frame for each group based on the counted result and obtain the summary content based on the main frame included in the predetermined group. For example, the processor 120 may count cases where the probability value is equal to or greater than 0.7 for each group. The processor 120 may set a counting unit for each frame. For example, the processor 120 may count the cases where the probability value corresponding to a group 1 in a frame 1 is equal to or greater than 0.7. The processor 120 may count the cases where the probability value corresponding to a group 2 in the frame 1 is equal to or greater than 0.7. The counting value for each group in the frame 1 may be (2, 0, 0).

Herein, it is described that the probability value is equal to or greater than 0.7, but the number 0.7 may be the predetermined threshold value and the value 0.7 may be changed by user's manipulation. In other words, the predetermined threshold value may be changed by the user. When the predetermined threshold value is increased, the number of times of the counting may decrease, and when the predetermined threshold value is decreased, the number of times of the counting may increase. The user may adjust the predetermined threshold value to increase an accuracy and satisfaction with respect to the identification of a desired object. The counting operation will be described below in detail with reference to FIG. 9.

Meanwhile, the processor 120 may count cases where the obtained probability value is equal to or greater than the predetermined threshold value for each object with respect to each of the plurality of frames, and obtain the summary content by identifying an object, the number of times of counting of which for each object is equal to or greater than the predetermined threshold value. When the object, the number of times of counting of which for each object is equal to or greater than the predetermined threshold value, is identified, the exceptionally identified object may be excluded from a target of the content. For example, it is assumed that, among 1000 frames in total, a car object is observed in 200 frames and a rabbit object is observed in 3 frames. Normally, it is considered that the possibility that the object exceptionally observed as the rabbit object may become a reference of the summary is low. In addition, if all objects are set as targets of the summary content, a processing speed may increase. In order to solve such a problem, the electronic device 100 may set only an object identified at a certain percentage or more from the total number of frames as a target of the summary content, in order to improve the processing speed, and set an object, the number of times of counting of which for each object is equal to or greater than the predetermined threshold value, as the target of the summary content.

In addition, the processor 120 may normalize the counted result for each group based on the number of objects belonging to each group.

The reason for the normalization is for reflecting a difference in number of objects for each group. For example, when the number of objects in a specific group is and the number of objects in another group is 2, the counting value may be high in the group with 10 objects. Accordingly, in order to accurately compare the counting values for each group, it is necessary to perform the normalization process. In an embodiment of the disclosure, the range of normalization is 1 to 10, but this may be changed by the user's setting. The normalization operation will be described below in detail with reference to FIG. 9.

The processor 120 may perform analysis to identify the target of the summary content using the normalized value.

The processor 120 may set a group with a maximum value as a representative group of the corresponding frame by comparing the normalized values obtained for each group. The frame 1 may have a plurality of normalized values and a group with the maximum value thereof may be identified as the representative group of the frame 1.

The processor 120 may set a representative group for each of the plurality of frames. When the user selects a specific representative group, the electronic device 100 may set a frame corresponding to the selected representative group as the target of the summary content.

The specific description regarding the usage of the maximum value will be described below with reference to FIG. 10.

Meanwhile, unlike the method using the maximum value described above, the processor 120 may apply a weight for each group to the normalized value for each group of each of the plurality of frames and obtain the summary content based on the value applied with the weight.

Herein, the electronic device 100 may extract a frame by applying the different weights for each group. For example, it is assumed that the user prefers the group 1 most and the group 2 secondly. The electronic device 100 may set a weight of 0.7 for the group 1, a weight of 0.2 for the group 2, and a weight of 0.1 for a group 3. The electronic device 100 may apply the weight corresponding to each group for each frame. It is assumed that the value after applying the weight may refer to a final value, for convenience.

The electronic device 100 may apply the weight for each group to the normalized counting value and obtain the final value for each frame. Herein, the final value obtained for each frame may be a numerical value obtained by reflecting preferred groups of the user.

The electronic device 100 may extract a frame with a value equal to or greater than the predetermined threshold value using the final value.

The electronic device 100 may reflect the preference of the user more specifically, if the weight for each group is applied. In addition, the electronic device 100 may reflect importance of not only any one group, but also various groups, thereby increasing satisfaction with respect to the summary content.

Meanwhile, when there is a request of the summary content of the user, the electronic device 100 may generate the summary content based on predetermined time. The electronic device 100 may summarize all of summary contents to have the same time in accordance with the user's setting. For example, the electronic device 100 may generate a 5-minute summary content from all of 10-minute, 100-minute, and 500-minute videos.

In addition, the electronic device 100 may generate a summary content based on the total play time of a summary content selected by the user. For example, the electronic device 100 may generate a 1-minute summary content from 10-minute content, a 10-minute summary content from a 100-minute content, and a 50-minute summary content from a 500-minute content.

Meanwhile, the electronic device 100 according to another embodiment of the disclosure may set so that the user directly selects the play time of the summary content.

Specifically, when the user selects the play time of the summary content, it is necessary for the electronic device 100 to generate the summary content so that the play time thereof correspond to the time desired by the user as close as possible.

When the play time of the summary content input in accordance with a user's command is longer than the play time of the obtained summary content, the electronic device 100 may increase the number of frames which may be the target of summary content.

In order to increase the number of frames to be the target, the electronic device 100 may adjust various threshold values described above. In addition, the electronic device 100 may update the summary content by adding frames within a range of the predetermined play time from a play point of the summary content.

For example, this is a method for arbitrarily adding neighboring frames (e.g., frames within a range of the predetermined play time from the play point of the summary content) of the frame to be the target of the summary content. It is assumed that $20^{th}$ to $40^{th}$ frames are generated as the summary content from first to $100^{th}$ frames. When it is determined that there is no target of the summary content desired by the user even with the adjustment of the threshold values described above, the electronic device 100 may add neighboring frames (e.g., frames within a range of the predetermined play time from the play point of the summary content) of the frame to be target of the summary content. In the example described above, the electronic device 100 may add the neighboring frames (e.g., frames within a range of the predetermined play time from the play point of the summary content) and set $15^{th}$ to $45^{th}$ frames as the target of the summary content.

The processor 120 may identify a representative object among objects belonging to each group, display information regarding the identified representative object on a display, and control a display 130 to provide a summary content obtained based on a main frame of a group, to which a specific object belongs, when information regarding the specific object is selected by the user.

Meanwhile, the electronic device 100 may further include the display 130, and the display 130 herein may be a hardware element of the electronic device 100 and may correspond to a separate display connected to the electronic device 100.

The electronic device 100 may directly control the display included in the electronic device 100. The electronic device 100 may determine a content to be displayed on a display and display the content via the display.

Meanwhile, the electronic device 100 according to another embodiment of the disclosure may be implemented as a type of generating a video signal and transferring the generated video signal to an external display device. The electronic device 100 may output a video signal and transmit the video signal to an external display device and the external display device may receive the video signal output from the electronic device 100 and display the corresponding content on a display.

Meanwhile, a type of an object extracted for each frame and a degree of distribution thereof for the total play time may be expressed using Mathematical Expression 1 below.

$$F = U_{i=1}^{N} f_i, \qquad \text{[Mathematical Expression 1]}$$
$$f_i = \{(l_{i_1}, p_{i_1}), (l_{i_2}, p_{i_2}), \ldots, (l_{i_n}, p_{i_n})\}$$

In this expression, f_i represents an assembly of an object $1\_(i\_(1 \ldots n))$ extracted from an i-th frame and a matching probability $p\_(i\_(1 \ldots n))$. N represents a total number of frames and n represents the number of objects extracted from the i-th frame.

In addition, many different objects are extracted from each frame of the video, and these objects may include objects which are extracted with an extremely low probability or an extremely low frequency. In the disclosure, a preprocessing filtering step of removing unnecessary objects as described above in advance may be performed, before measuring interrelationship between objects of each frame. First, when a matching probability (p_(i_j)) of the object in each frame is smaller than a threshold value (t_p), a matching accuracy with the object is determined to be lower to that extent, and the operation of removing the object may be performed. In the disclosure, the corresponding threshold value may be set as 0.4 (see Mathematical Expression 2). In this expression, f_i^' represents a result obtained by filtering the i-th frame out based on the matching probability.

$$f_j'\{(l,p) | (l_{ij}, p_{ij}), p_{ij} \geq t_p, \quad j=1, \ldots, n\}, \quad (t_p=0.4)$$
[Mathematical Expression 2]

In addition, when a frequency of extracted objects is lower compared to the total play time, the operation of determining and removing the object as the object having a low accuracy may be performed. The total play time may be assumed as a total number N of frames. An extraction frequency (o_ij) of a j-th object may be obtained by counting a number n(·) of extracted specific objects from all of the frames. For example, if an object "vehicle" is extracted with a probability equal to or greater than 0.4 between first to $100^{th}$ frames, $150^{th}$ to $230^{th}$ frames, and $500^{th}$ to $700^{th}$ frames of 1,000 frames in total, the object is extracted 380 times in total. Accordingly, the object is considered to be extracted with a probability of approximately 38%. The extraction frequencies of all objects are measured by such a method and the object extracted with a frequency smaller than a threshold value (t_o) may be assumed as an outlier and removed. In the disclosure, the corresponding threshold value may be set as 0.1 (see Mathematical Expression 3).

[Mathematical Expression 3]

$$f''_{ij} = \{(l, p) \mid (l_{ij}, p_{ij}), p_{ij} \geq t_p, o_{ij} \geq t_o, j = 1, \ldots, n\},$$
$$(t_p = 0.4, t_o = 0.1)$$
$$o_{ij} = \frac{n(U_{i=1}^{N} l_{ij})}{N}$$

f_ij'' represents a final filtering result of the i-th frame and a j-th object. In the case of the object classified as the outlier through the above process, p_(i_j)=0 is satisfied.

Figure 4:
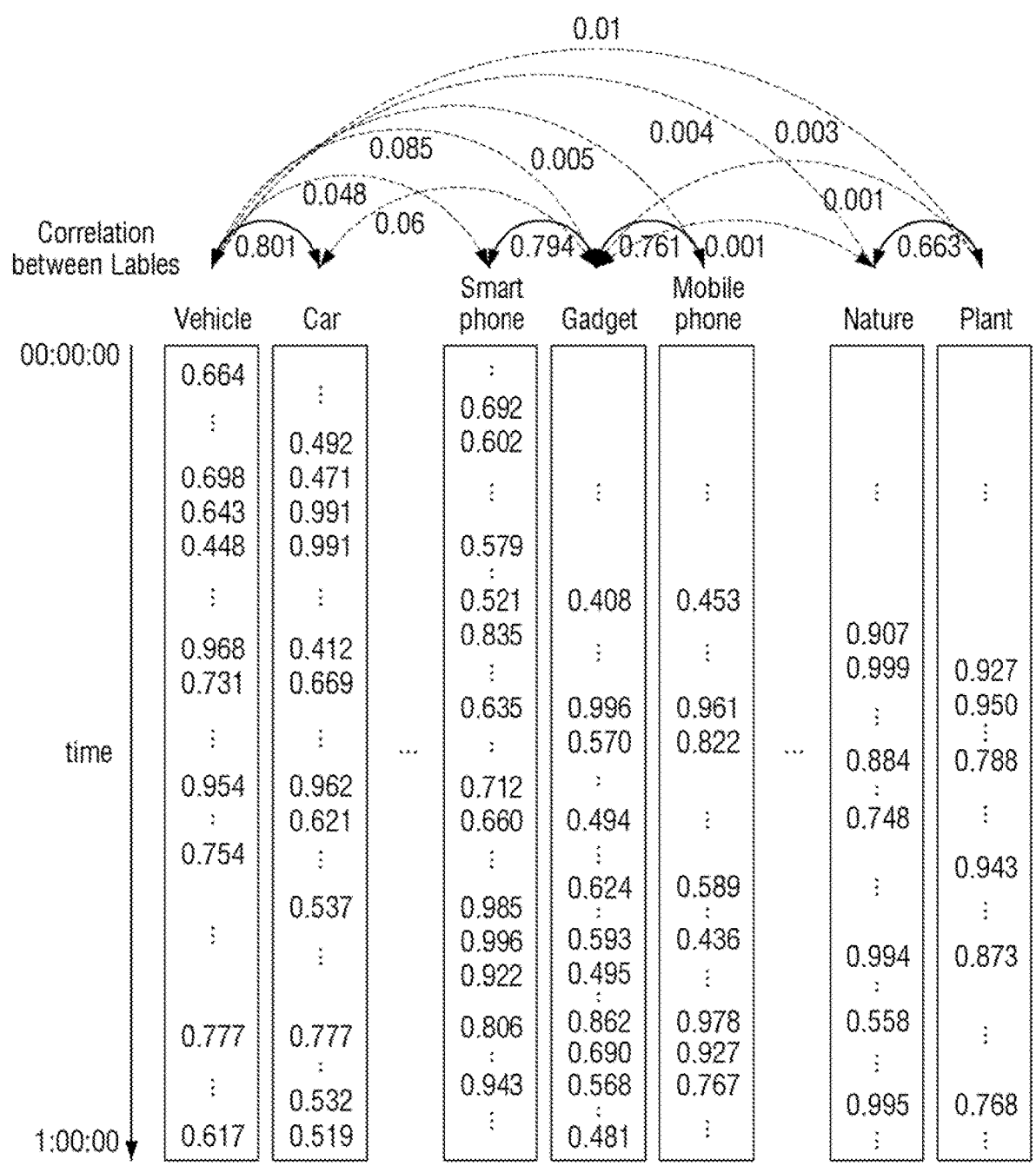
FIG. 4 is a diagram for illustrating a correlation value between a plurality of objects.

In this disclosure, the result of such objects may be set as axes of the entire play time of the video to calculate correlation of distribution thereof, thereby obtaining interrelationship between objects. Referring to FIG. 4, the distributions of the objects of "vehicle" and "car" on the time axis are similar by approximately 80%, the distributions of the objects of "gadget" and "smart phone" are similar by approximately 79%, and the distributions of the objects of "nature" and "plant" are similar by approximately 66%, thereby showing significant interrelationship. On the other hand, "vehicle" and "gadget" have a similarity of approximately 8%, "gadget" and "nature" have a similarity of approximately 0.1%, and "nature" and "vehicle" have a similarity of approximately 0.4%. Accordingly, substantially no interrelationship is observed between these objects.

Meanwhile, the processor 120 may perform the grouping operation and may use a mathematical expression as below.

$$G_j\{(l,p) | \text{corr}(f_{ij}', f_{ik}') \geq t_c, i=1, \ldots, N, K=1, \ldots, N\}$$
$$(j \neq k, t_c = 0.1) \qquad \text{[Mathematical Expression 4]}$$

G_j represents a group of objects related to the j-th object. In other words, when the interrelationship between the objects is equal to or greater than a specific threshold value (t_c), the objects are assumed to be related to the corresponding object and may be grouped.

Meanwhile, the electronic device 100 which performs the content summarization operation described above may correspond to a TV or an STB device. In this case, the electronic device 100 may directly generate the summary content using internal elements.

The electronic device 100 according to another embodiment of the disclosure may request content summarization to a separate server. For example, the electronic device 100 may receive a user command to generate the summary content and the electronic device 100 may transmit the user command to an external server. The external server may generate the summary content and may transmit the summary content to the electronic device 100.

In other words, the electronic device 100 according to an embodiment of the disclosure may perform all operations by itself.

In addition, the electronic device 100 according to still another embodiment of the disclosure may merely receive or output related information and the actual operation may be performed on the external server.

In addition, the electronic device 100 according to still another embodiment of the disclosure may perform some operations of the entire operation and the other operations may be performed on the external server.

Hereinabove, only the simple elements configuring the electronic device 100 has been illustrated and described, but in the implementation, various elements may be additionally provided. This will be described below with reference to FIG. 2.

Figure 2:
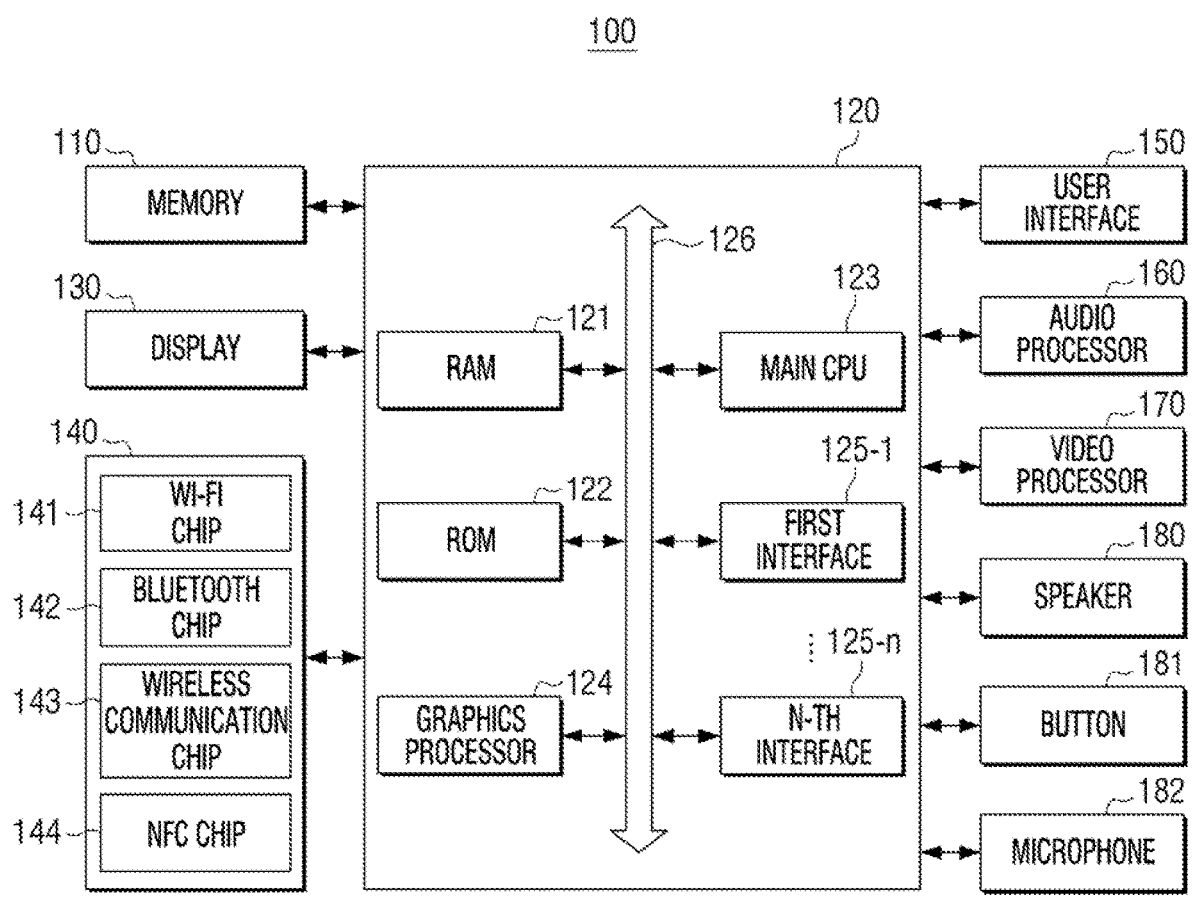
FIG. 2 is a block diagram for illustrating a specific configuration of the electronic device of FIG. 1.

FIG. 2 is a block diagram for illustrating an example of a specific configuration of the electronic device of 100. The electronic device 100 may include the memory 110 and the processor 120. Referring to FIG. 2, the electronic device 100 may further include the display 130, a communicator 140, a user interface 150, an audio processor 160, a video processor 170, a speaker 180, a button 181, and a microphone 182. The specific description of parts of the elements illustrated in FIG. 2 overlapped with the elements illustrated in FIG. 1 will not be repeated.

The processor 120 may generally control the operations of the electronic device 100 using various programs stored in the memory 110.

Specifically, the processor 120 may include a RAM 121, a ROM 122, a main CPU 123, a graphics processor 124, first to n-th interfaces 125-1 to 125-n, and a bus 126.

The RAM 121, the ROM 122, the main CPU 123, the graphics processor 124, the first to n-th interfaces 125-1 to 125-n, and the like may be connected to each other via the bus 126.

The first to n-th interfaces 125-1 to 125-n may be connected to the various elements described above. One of the interfaces may be a network interface connected to an external device via a network.

The main CPU 123 may execute the booting by using the O/S stored in the memory 110 by accessing the memory 110. The main CPU 123 may perform various operations using various programs and the like stored in the memory 110.

The ROM 122 may store a set of instructions for system booting. If a turn-on instruction is input to supply power, the main CPU 123 copies the O/S stored in the memory 110 to the RAM 121 and boots the system up by executing the O/S according to the instruction stored in the ROM 122. If the booting is completed, the main CPU 123 copies various application programs stored in the memory 110 to the RAM 121 and performs various operations by executing the application programs copied to the RAM 121.

The graphics processor 124 may generate a screen including various objects such as icons, images, texts, and the like by using an operating unit (not shown) and a rendering unit (not shown). The operating unit (not shown) may calculate attribute values such as a coordinate value of each object to be displayed, a shape, a size, a color and the like thereof according to the layout of the screen based on a received control command. The rendering unit (not shown) may generate screens having various layouts including objects based on the attribute values calculated by the operating unit (not shown). The screen generated by the rendering unit (not shown) may be displayed in a display region of the display 130.

The operations of the processor 120 described above may be performed by programs stored in the memory 110.

The memory 110 may store various pieces of data such as an operating system (O/S) software module, an audio signal analysis module, a video frame editing module, and the like for operating the electronic device 100.

The display 130 may be implemented as various types of displays such as a liquid crystal display (LCD), an organic light emitting diodes (OLED) display, a plasma display panel (PDP), and the like. The display 130 may also include a driving circuit or a backlight unit which may be implemented in a form of a-si TFT, a low temperature poly silicon (LTPS) TFT, or an organic TFT (OTFT). The display 130 may be implemented as a touch screen by combining with a touch detector.

The communicator 140 may be an element for communicating with various types of external devices according to various types of communication methods. The communicator 140 may include a Wi-Fi chip 141, a Bluetooth chip 142, a wireless communication chip 143, and an NFC chip 144. The processor 120 may communicate with various external devices via the communicator 140.

Each of the Wi-Fi chip 141 and the Bluetooth chip 142 may perform communication by a Wi-Fi system and a Bluetooth system. When using the Wi-Fi chip 141 or the Bluetooth chip 142, various pieces of connection information such as SSID or session key may be transmitted or received first to allow the communication connection by using these, and then various pieces of information may be transmitted and received. The wireless communication chip 143 may refer to a chip executing the communication based on various communication standards such as IEEE, Zigbee, 3rd Generation (3G), 3rd Generation Partnership Project (3GPP), and Long Term Evolution (LTE). The NFC chip 144 may refer to a chip operated in a near field communication (NFC) system using 13.56 MHz band among various RF-ID frequency bands of 135 kHz, 13.56 MHz, 433 MHz, 860 to 960 MHz, 2.45 GHz, and the like.

In addition, the communicator 140 may further include a wired communication interface such as HDMI, MHL, USB, DP, Thunderbolt, RGB, D-SUB, DVI, or the like. The processor 120 may be connected to a display device via the wired communication interface of the communicator 140. In this case, the processor 120 may transmit the obtained summary content to the display device via the wired communication interface.

The user interface 150 may receive various user interactions. The user interface 150 may be implemented in various forms according to the implementation example of the electronic device 100. For example, the user interface 150 may be a button provided on the electronic device 100, a microphone receiving a user's voice, or a camera detecting a user's motion. In addition, when the electronic device 100 is implemented as a touch-based terminal device, the user interface 150 may be implemented in a form of a touch screen forming a layer structure with a touch pad. In this case, the user interface 150 may be used as the display 130 described above.

The audio processor 160 is an element executing processing of audio data. The audio processor 160 may execute various processing such as decoding, amplification, or noise filtering regarding the audio data.

The video processor 170 is an element executing processing regarding video data. The video processor 170 may execute various image processing such as decoding, scaling, noise filtering, frame rate conversion, or resolution conversion regarding the video data.

The speaker 180 is an element outputting not only various pieces of audio data processed by the audio processor 160, but also various alerts or voice messages.

The button 181 may be various types of buttons such as a mechanical button, a touch pad, or a wheel formed in any region of a front portion, a side portion, or a rear portion of the appearance of the main body of the electronic device 100.

The microphone 182 is an element for receiving user's voices and other sounds and converting the sounds into audio data.

The microphone may receive the user's voice in an activated state. For example, the microphone 182 may be integrally formed on an upper portion, a front portion, or a side portion of the electronic device 100. The microphone 182 may be an element for receiving a voice input. The microphone 182 may include various elements such as a microphone for collecting a user's voice in an analogue form, an amplification circuit for amplifying the collected user's voice, an A/D conversion circuit for sampling the amplified user's voice and converting the voice into a digital signal, a filter circuit for removing a noise component from the converted digital signal, and the like.

The type, the size, the position, and the like of the microphone 812 may vary depending on a type of an operation to be implemented using the remote controller or an external shape of the remote controller, usage of the remote controller, and the like. If the remote controller is implemented as a hexahedron having a rectangular front surface, the microphone 182 may be disposed on a front surface of the remote controller.

The user may perform voice recognition via the microphone 182 of the electronic device 100. Accordingly, all of operations in the specification may be performed only with the microphone of the electronic device 100, without the microphone included in the external device.

In the above description, it is described that the electronic device 100 directly includes the microphone, but in the implementation, the microphone may be an element included in the external device.

In this case, when the microphone included in the external device receives an analogue voice signal of the user, the external device may convert the received analogue voice signal into a digital signal. The external device may transmit the converted digital signal to the electronic device 100. The external device may use a wireless communication for transmitting the converted digital signal to the electronic device 100 and the wireless communication method may be a method using Bluetooth or Wi-Fi. In addition, the wireless communication method is described as the method using Bluetooth or Wi-Fi, but in the implementation, various wireless communication methods may be used, in addition to the method using Bluetooth or Wi-Fi.

The external device may be a remote controller. The remote controller may correspond to a device for controlling a specific device and may correspond to a remote controller, and the user may perform voice recognition operation via a microphone attached to the remote controller.

Meanwhile, the external device may correspond to a terminal device such as a smart phone. The user may perform the voice recognition operation via a microphone included in the smart phone. In this case, the user may install a specific application to perform the voice recognition operation and transmit a result of performing the voice recognition operation to the electronic device 100. In addition, the user may control the electronic device 100 using a specific application.

In this case, the smart phone including the microphone may include a communicator using Bluetooth, Wi-Fi, infrared ray, and the like for transmitting and receiving data and controlling the electronic device 100. In this case, the communicator of the external device may be formed of a plurality of elements according to the communication method.

The external device including the microphone may include a communicator using Bluetooth, Wi-Fi, infrared ray, and the like for transmitting and receiving data and controlling the electronic device 100. In this case, the communicator of the external device may be formed of a plurality of elements according to the communication method.

Further, the electronic device 100 which receives data transmission and reception and control commands from the external device may include a communicator using Bluetooth, Wi-Fi, infrared ray, and the like. In this case, the communicator of the electronic device 100 may be formed of a plurality of elements according to the communication method.

Meanwhile, the electronic device 100 may communicate with an external server. Specifically, the electronic device 100 may transmit data to the external server and receive data from the external server. In this case, in order to communicate with the external server, the electronic device 100 may use the wireless or wired communication method.

The electronic device 100 may communicate with the external server and the external device at the same time. Specifically, the electronic device 100 may receive data from the external device and transmit the data to the external server. In this case, the communicator of the electronic device 100 communicating with the external device and the external server may be formed as one module. The one module may be a Wi-Fi module.

Meanwhile, the communicator of the electronic device 100 may be formed of a plurality of modules and communicate with the external device or the external server using different communicators, respectively. For example, the electronic device 100 may communicate with the external device using a Bluetooth module and communicate with the external server using an Ethernet modem or a Wi-Fi module.

The electronic device 100 according to an embodiment of the disclosure may transmit a received digital voice signal to a voice recognition external server. The voice recognition external server may perform a speech-to-text (STT) function of converting a digital voice signal into text information. The voice recognition external server may convert the digital voice signal into the text information by performing the STT function and search for information corresponding to the converted text information. The voice recognition external server may transmit the information corresponding to the converted text information to the electronic device 100. The voice recognition external server may perform the speech-to-text (STT) function and the search function at the same time.

Meanwhile, the voice recognition external server may only perform the speech-to-text (STT) function and the search function may be performed on a separate external server. In this case, the digital voice signal may be converted into the text information on the external server for performing the speech-to-text (STT) function and the converted text information may be transmitted to the separate external server for performing the search function.

The electronic device 100 according to still another embodiment of the disclosure may directly perform the speech-to-text (STT) function. The electronic device 100 may convert the digital sound signal into the text information and transmit the converted text information to the voice recognition external server. In this case, the voice recognition external server may perform only the search function. The voice recognition external server may search for the information corresponding to the converted text information and transmit the information to the electronic device 100.

Hereinafter, the operations of the electronic device 100 will be described in detail with reference to the drawings.

FIG. 3 is a view for illustrating an operation of obtaining a probability value from a frame.

Referring to FIG. 3, the electronic device 100 may obtain a plurality of frames from a content. The electronic device 100 may identify objects included in each of the plurality of frames. A high possibility value of the identified object may imply a high relation to the identified object.

For example, it is assumed that the $41^{st}$ frame includes a scene that a man is hunting an animal in the wild. The electronic device 100 may identify (object, probability value). Specifically, the electronic device 100 may identify probability values with respect to (Nature, 0.974), (Plant, 0.788), (Animal, 0.711), (Wildlife, 0.66), and (Hunting, 0.595).

The electronic device 100 may obtain which objects the objects included in the $41^{st}$ frame correspond to and whether the objects corresponding thereto as probability values.

In the same manner, it is assumed that the $1799^{th}$ frame includes a man using a smart phone and a laptop. The electronic device 100 may obtain objects relating thereto and probability values.

In addition, it is assumed that the $2154^{th}$ frame includes a moving car. The electronic device 100 may obtain objects relating thereto and probability values.

Herein, the number of objects identified for each frame may vary depending on a program applied.

FIG. 4 is a diagram for illustrating a correlation value between a plurality of objects.

Referring to FIG. 4, the electronic device 100 may obtain a probability value for each object with respect to each frame. The plurality of objects may be included in each frame and whether the plurality of objects are included may be displayed as the probability value.

The electronic device 100 may analyze a correlation between the plurality of objects with respect to the total play time. For example, the correlation between the vehicle object and the car object may be displayed as the number, 0.801. In the calculation process according to an embodiment of the disclosure, a method for obtaining a correlation coefficient was used. However, in the correlation analysis, various statistic technologies may be applied.

Figure 5:
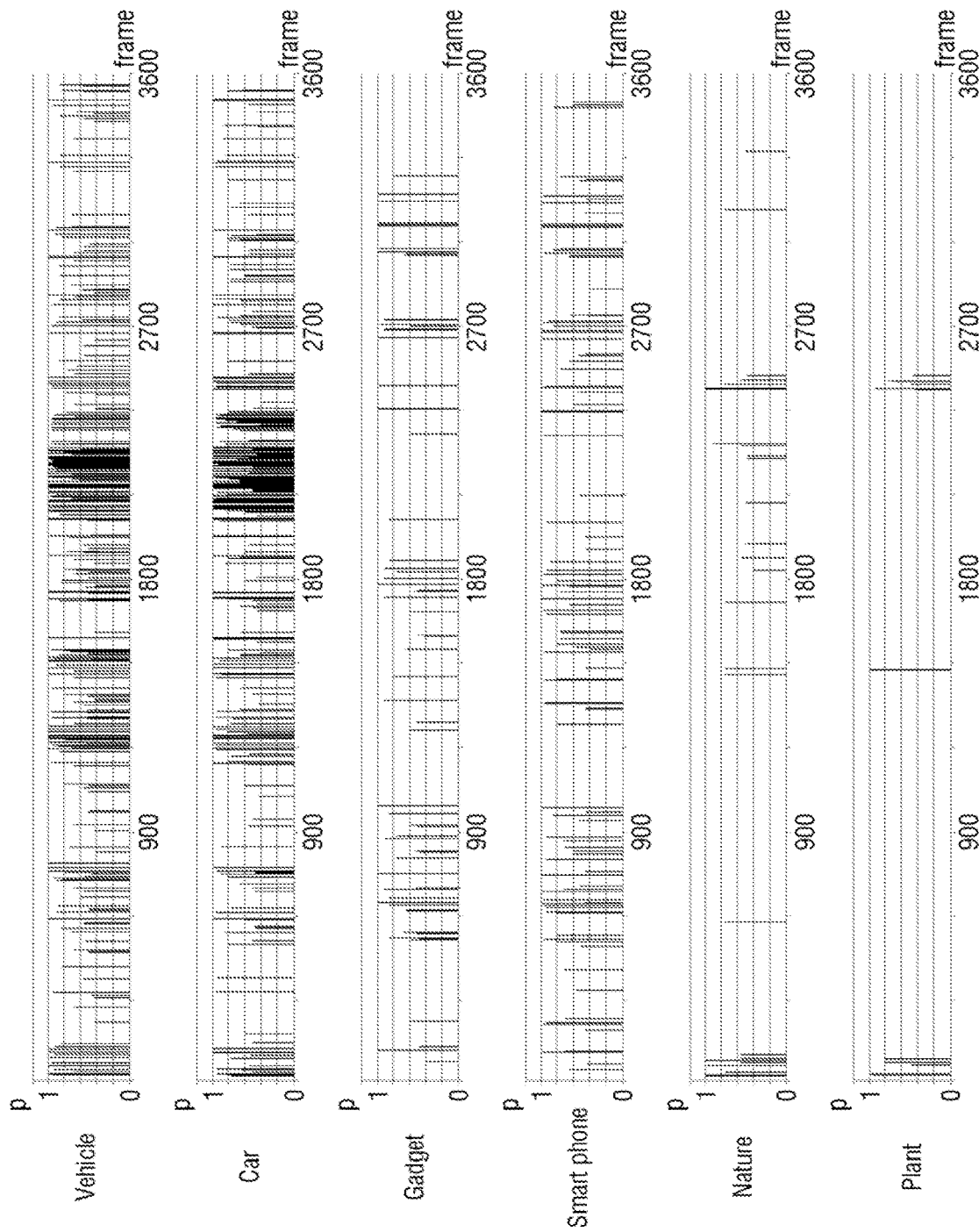
FIG. 5 is a diagram for illustrating a distribution of probability values for each object for a total play time.

FIG. 5 is a diagram for illustrating a distribution of probability values for each object for a total play time.

Referring to FIG. 5, it may be confirmed how the probability value indicating that the object corresponds to a specific object changes according to the order of frames. The electronic device 100 may identify the distribution of probability values according to the object. The distribution of the probability values indicating that the object corresponds to each object may be identified in a unit of the frame. A total number of frames is assumed as 3,600 and the electronic device 100 may analyze each of 3,600 frames and identify the probability value indicating the object included in each frame corresponds to the specific object.

Figure 6:
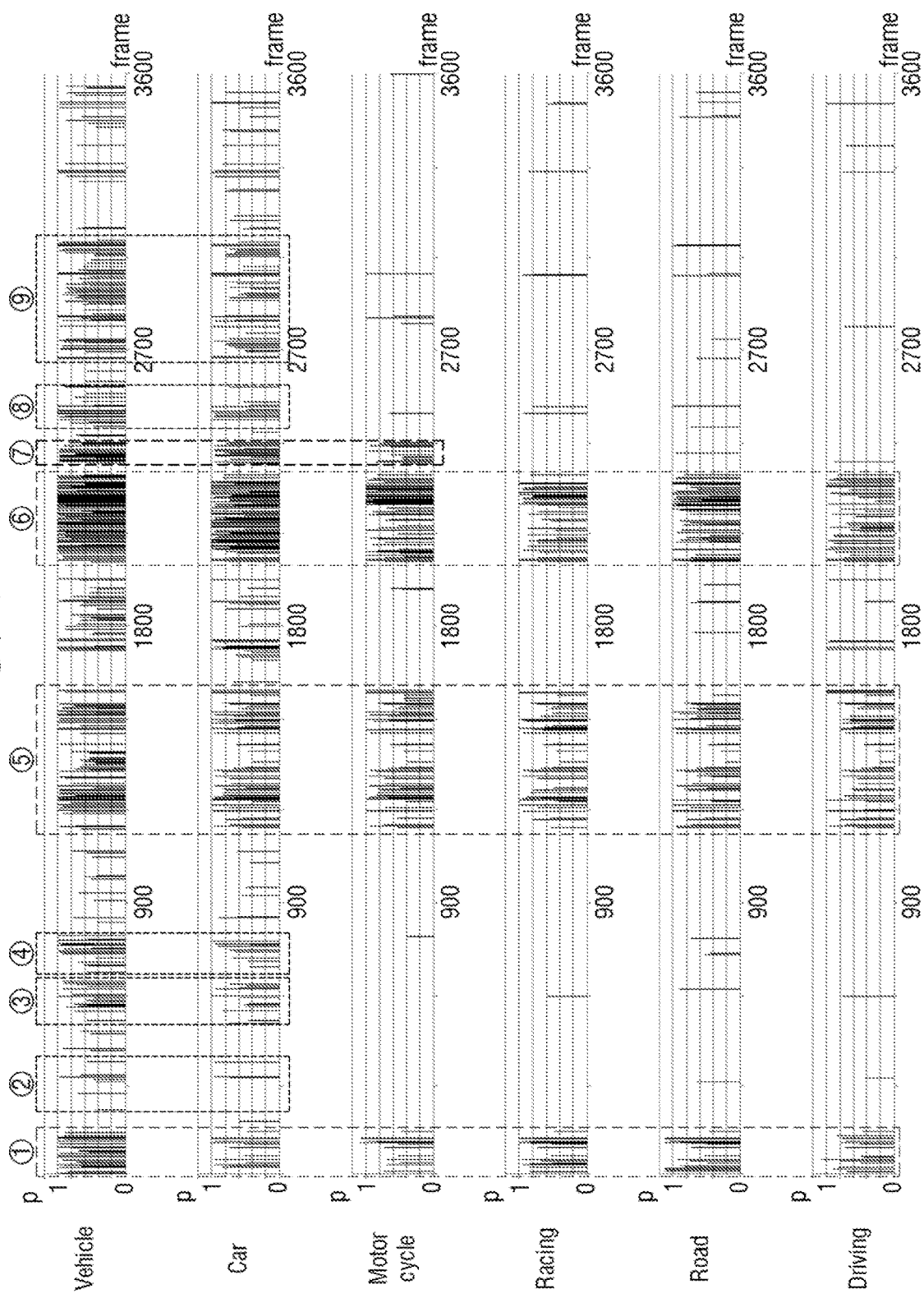
FIG. 6 is a diagram for illustrating an operation of grouping frames and performing counting.

FIG. 6 is a diagram for illustrating an operation of grouping frames and performing counting.

Referring to FIG. 6, all of vehicle, car, motor cycle, racing, road, and driving objects are assumed as in the same group. All of the objects correspond to the object related to vehicle, and the electronic device 100 may perform analysis for each object group in order to extract the summary content. For example, the distribution of probabilities with respect to the plurality of objects may be obtained in FIG. 5, and then, the frame having the probability value equal to or greater than the predetermined threshold value may be detected. When the probability value greater than the predetermined threshold value is obtained, the electronic device 100 may identify that the corresponding object is included in the frame.

The electronic device 100 may count the objects having the probability value greater than the predetermined threshold value for each frame. The process of counting the objects for each frame will be described below with reference to FIG. 9.

Meanwhile, the electronic device 100 may group the frames in a certain unit. The operation of grouping the frames may be different from the operation of grouping the objects, and the summary content generation in the unit of scene may be performed by the operation of grouping the frames. Accordingly, it is possible to increase satisfaction of the user. Further, it is possible to reduce the calculation process of the processor, thereby reducing a generation speed of the summary content.

Specifically, the electronic device 100 may identify a representative object among the vehicle, the car, the motor cycle, the racing, the road, and the driving objects. A criterion for identifying the representative object is a highest average of probability values of the object in the same group. In addition, the electronic device 100 may identify an object having a large number of probability values equal to or greater than the predetermined threshold value as the representative object. The specific method is described, but the method for identifying the representative object is not limited to the method described above, and various methods for selecting an object which may represent the same group may be applied.

Referring to FIG. 6, the representative object is assumed as the vehicle object. After selecting the representative object, the frames may be grouped into a specific section based on the representative object. The grouping of the frames may correspond to another grouping operation which is different from the grouping of the objects, and the electronic device 100 may group the frames according to a time section.

The electronic device 100 may group the frames based on the representative object. Referring to FIG. 6, the probability value of the representative object may be analyzed for each frame and the frames may be grouped.

One of methods for grouping the frames is concerning a density by analyzing the distribution of the probability values. Specifically, if the frames having probabilities equal to or greater than the predetermined threshold value are arranged in the order of time, the frames having the probability values equal to or greater than the predetermined threshold value may be observed in a specific time zone. When it is determined that the frames having the probability values equal to or greater than the predetermined threshold value are dense, the electronic device 100 may group the corresponding frames into one group.

Referring to FIG. 6, the electronic device 100 may identify nine frame groups based on the vehicle object which is the representative object. The parts other than the nine frame groups may imply that the frames having probability values equal to or greater than the predetermined threshold value are not continuously identified. On the other hand, any one frame belonging to the nine frame groups may imply that it belongs to the frames having high probability that the vehicle object is included.

The electronic device 100 may determine whether the frames having the probability values equal to or greater than the predetermined threshold value are continuous, in order to identify a start point and an end point of the frame group. For example, in order to identify the frame including the vehicle object, the electronic device 100 may confirm whether each frame has probability values equal to or greater than the predetermined threshold value. It is assumed that the electronic device 100 has observed the frame having the probability values equal to or greater than the predetermined threshold value in a fifth frame. It is also assumed that seventh, ninth, and tenth frames have probability values equal to or greater than the predetermined threshold value. Then, it is assumed that a $100^{th}$ frame has probability values equal to or greater than the predetermined threshold value.

The electronic device 100 may determine whether the frames are continuous with respect to 20 frames. The electronic device 100 may confirm that the fifth, seventh, ninth, and tenth frames are frames having probability values equal to or greater than the predetermined threshold value and group the fifth to tenth frames. The electronic device 100 may analyze 20 frames having the probability values equal to or greater than the predetermined threshold value subsequent to the tenth frame. If all of the 20 frames subsequent to the tenth frame do not have the probability values equal to or greater than the predetermined threshold value, the electronic device 100 may identify the tenth frame as an end frame of the grouping.

When grouping the frames, the electronic device 100 may select and group only the frames having probability values equal to or greater than the predetermined threshold value. In the above example, the electronic device 100 may group the fifth, seventh, ninth, and tenth frames into one group.

Meanwhile, when grouping the frames, the electronic device 100 may perform the grouping by including frames not having probability values equal to or greater than the predetermined threshold value. In the above example, the electronic device 100 may group the fifth, sixth, seventh, eighth, ninth, and tenth frames into one group. In this case, the electronic device 100 may set all of frames between a start frame and an end frame of the grouping into one group and this may exhibit an effect that the summary content smoothly flows.

In the description with reference to FIG. 6, the predetermined threshold value may be changed according to the user's intention and may be automatically changed to an appropriate value. In addition, the 20 frames which are the criterion for determining whether the frames are continuous may also be changed.

The electronic device 100 may generate a group only when the number of continuous frames of the group is equal to or greater than a threshold value. For example, the electronic device 100 may group the frames only when the number of continuous frames is equal to or greater than 5, and may not generate a group, if less than 5 frames are continuous. The criterion of 5 frames may be changed by the user's setting.

The electronic device 100 may perform the counting operation for each group of the grouped frames. The electronic device 100 may perform the counting operation for each group of grouped objects. In the description with reference to FIG. 6, the electronic device 100 may perform two grouping operations. A first grouping operation is grouping objects having a high relation into one group and a second grouping operation is grouping frames having continuity into one group. The electronic device 100 may perform the two grouping operations using the probability values of the object.

In the description with reference to FIG. 6, it is assumed that the vehicle object is the representative object and the car, motor cycle, racing, road, and driving objects are set as one group. In addition, it is assumed that frames having continuity are grouped into a group 1 to a group 9.

The electronic device 100 may perform the counting operation with respect to frames of the group 1. Herein, the counting operation may be counting frames having probability values equal to or greater than the predetermined threshold value from the frames corresponding to the group 1. The electronic device 100 may identify importance with respect to the frame group based on the counted frames. The electronic device 100 may identify the number of groups having a pattern similar to a representative group, in order to determine the importance. For example, in the case of frames in the groups 1, 5, and 6, it may be confirmed that the similar pattern appears in all of the vehicle, car, motor cycle, racing, road, and driving objects.

Herein, the similar pattern may refer to similar distribution of probability values with respect to each object. For example, in the first frame, the probability values with respect to the vehicle, car, motor cycle, racing, road, and driving objects may be different from each other, and the electronic device 100 may determine whether the patterns are similar by comparing the distribution of probability values in a certain range (time) for each object.

In order to determine whether the patterns are similar, the electronic device 100 may perform the counting operation for each object in the frame in a certain range (time). Specifically, the electronic device 100 may perform the operation of counting objects included in the frame in the certain range (time). The electronic device 100 may count the number of probability values equal to or greater than the predetermined threshold value for each object. The electronic device 100 may identify the similar pattern by comparing the counting values. For example, the fifth to tenth frames are assumed as one group. The electronic device 100 may count the number of frames having probability values equal to or greater than the predetermined threshold value by analyzing the probability values of the vehicle object in the fifth to tenth frames. In the same manner, the electronic device 100 may count the number of frames having probability values equal to or greater than the predetermined threshold value with respect to other objects. When the number of frames is within a certain range, the electronic device 100 may identify that the distributions of the probability values of the object show the similar pattern.

Referring to FIG. 6, the electronic device 100 may identify that the distributions of the probability values for each object corresponding to the frames of the group 1 have the similar pattern.

In addition, the distributions of the vehicle, car, and motor cycle objects have the similar pattern in the frames of the group 7. The distributions of the vehicle and car objects have the similar pattern in the frames of the groups 2, 3, 4, 8, and 9. Herein, the electronic device 100 may identify that the frame group with a large number of similar patterns has high importance. The electronic device 100 may identify the similar pattern of the five types of objects in the frames of the groups 1, 5, and 6, and may determine that these frame groups are more important parts than other frame groups. The electronic device 100 may determine that the frames of the group 7 are more important than the frames of the groups 2, 3, 4, 8, and 9, and the reason therefor is because the frames of the group 7 contain a large number of object types having similar patterns.

The electronic device 100 may determine importance by identifying whether the probability values of the object have the similar pattern. The criterion for determining the importance may be the number of objects having the similar pattern. For example, the importance of the frames of the groups 1, 5, and 6 may be 5, the importance of the frames of the group 7 may be 3, and the importance of the frames of the groups 2, 3, 4, 8 and 9 may be 2. The electronic device 100 may divide the importance relatively for each frame group and the electronic device 100 may determine whether to extract the frames as the target of the summary content in accordance with the importance value.

The arbitrary method is disclosed regarding the importance value, for convenience of description, and the electronic device 100 may apply various analysis methods. For example, the electronic device 100 may determine the importance for each individual frame, without grouping the frames. The operation of counting each frame will be described below in detail with reference to FIG. 9.

FIGS. 7 to 11 are diagrams for illustrating a frame execution process according to an embodiment.

In the description with reference to FIGS. 7 to 11, for convenience of description, the types of the objects are limited to 5 types of a to e in total and the frames are assumed as five frames of 1 to 5.

FIG. 7 is a table showing a relation between objects and frames. Specifically, a probability value that the object corresponds to a specific object is illustrated for each frame. A plurality of objects may be included in a frame 1. The electronic device 100 may analyze the plurality of objects included in each frame and obtain a probability that predetermined objects (object a, object b, object c, object d, and object e) are included in each frame. Referring to FIG. 7, the electronic device 100 may obtain a probability that any one object included in the frame 1 corresponds to the object a as 0.9. The probability that any one object corresponds to the object b may be 0.8, the probability that any one object corresponds to the object c may be 0.1, the probability that any one object corresponds to the object d may be 0.1, and the probability that any one object corresponds to the object e may be 0.1.

A correlation value (relation value) for each object (object a, object b, object c, object d, and object e) may be obtained using probability values of the specific object from the frame 1 to the frame 5 obtained in FIG. 7.

Figure 8:

FIG. 8 is a diagram for illustrating an operation of obtaining a correlation value (relation value) between the plurality of objects and performing the grouping using the correlation value (relation value).

(a) of FIG. 8 is a table showing the correlation value (relation value) for each object (object a, object b, object c, object d, and object e). The electronic device 100 may obtain the correlation value (relation value)s using the probability values obtained in FIG. 7. For example, a correlation coefficient between probability values (0.9, 0.8, 0.5, 0.7, and 0.2) of the object a and probability values (0.8, 0.7, 0.5, 0.3, and 0.1) of the object b may be obtained to obtain the correlation value (relation value).

The correlation coefficient may be a positive or negative number, and the electronic device 100 according to an embodiment of the disclosure may obtain a correlation value (relation value) by obtaining an absolute value to convert all of the numbers into positive numbers. When the correlation value (relation value) obtained by obtaining the absolute value is equal to or greater than 0.7, the electronic device 100 may analyze that the objects have a high correlation, and when the correlation value (relation value) is equal to or smaller than 0.3, the electronic device 100 may analyze that the objects have a low correlation. In addition, in a case of the correlation value (relation value) of 0.3 to 0.7, the electronic device 100 may analyze that the objects have a medium correlation. Herein, the value 0.3 or 0.7 may be changed by the user and is merely a value derived through repeated simulation. Accordingly, the above values may be changed with a user's intention or through analysis.

Meanwhile, the electronic device 100 according to another embodiment of the disclosure may obtain a correlation coefficient without obtaining the absolute value of the correlation coefficient. In this case, the correlation value may be a positive or negative number. In this case, the user may exclude the correlation with the negative number, and analyze only the correlation with the positive number as a high correlation. For example, it is assumed that the correlation coefficients are obtained as 0.8, 0.3, −0.3, and −0.8. The electronic device 100 may analyze that only the relation corresponding to the value of 0.8 has a high correlation. However, this is merely one of various embodiments and it is not necessary to apply only one analysis method. The content of analyzing only the correlation of the amounts as the high correlation is not disclosed in the drawings.

Meanwhile, hereinabove, the process of obtaining the correlation value (relation value)s is described in association with the method for obtaining the correlation coefficient. But, this is merely one method for analyzing the specific object and another object and various analysis methods may be used.

The electronic device 100 may group the objects using the correlation value (relation value)s obtained in FIG. 8(*a*). Specifically, the electronic device 100 may group the objects having the correlation value (relation value) equal to or greater than 0.7 into one group.

In FIG. 8(*a*), a-b and c-d show the correlation value (relation value)s equal to or greater than 7. Accordingly, a and b may be set as a group 1. c and d may be set as a group 2. The object e analyzed to be not related to other objects may be set as a group 3. The reason for grouping is for obtaining the summary content by grouping the objects having interrelationship. The operation of identifying the object in the frame is the analysis of the probability value. Accordingly, if a summary content is generated only with one object, an accuracy may decrease. However, when the objects are grouped and identified, other objects highly related to a specific object desired by the user may be a target of the summary content, thereby increasing the accuracy.

FIG. 9 illustrates probability values illustrated in FIG. 7 for each group. FIG. 7 illustrates the probability values for each object and FIG. 9 illustrates the probability for each group. The columns with diagonal stripes may indicate cases where the probability value is equal to or greater than 0.7.

The electronic device 100 may count the cases where the probability value is equal to or greater than 0.7 for each group. The electronic device 100 may set the counting unit for each frame. For example, the electronic device 100 may count the cases where the probability value corresponding to a group 1 in the frame 1 is equal to or greater than 0.7. The electronic device 100 may count the cases where the probability value corresponding to a group 2 in the frame 1 is equal to or greater than 0.7. The counting value for each group in the frame 1 may be (2, 0, 0).

The summary of counting values for each frame is illustrated in (b) of FIG. 9. The values therein may be the number of times of counting of the columns with the diagonal stripes in (a) of FIG. 9.

Herein, the case where the probability value is equal to or greater than 0.7 is described, but the number, 0.7, may be the predetermined threshold value and the value, 0.7, may be changed by user's manipulation. In other words, the predetermined threshold value may be changed by the user. When the predetermined threshold value is increased, the number of times of the counting may decrease, and when the predetermined threshold value is decreased, the number of times of the counting may increase. The user may adjust the predetermined threshold value to increase an accuracy and satisfaction with respect to the identification of a desired object.

The electronic device 100 may perform normalization based on the counting values obtained in (b) of FIG. 9. For example, the values obtained in (b) of FIG. 9 may be normalized in a range of 1 to 10. The reason for the normalization is for reflecting a difference in number of objects for each group. For example, when the number of objects in a specific group is 10 and the number of objects in another group is 2, the counting value may be higher in the group with 10 objects. Accordingly, in order to accurately compare the counting values for each group, it is necessary to perform the normalization process. In an embodiment of the disclosure, the range of normalization is set as 1 to 10, but this may be changed by the user's setting.

The counting value normalized for each group obtained in FIG. 9 may be used to extract the content of the frame. For example, values (10, 0, 0) in which the value of the frame 1 in the group 1 is 10, the value thereof in the group 2 is 0, and the value thereof in the group 3 is 0, among the counting values normalized for each group obtained in FIG. 9(*c*) may be obtained. Since the range of the normalization is set as 1 to 10, it is surmised that the frame 1 includes only the object for the group 1. For the value for the frame 2, values (10, 5, 0) for each group may be obtained, and it is surmised that the frame 2 includes objects of the group 1 and the group 2. It is surmised that the frame 2 includes a larger number of objects of the group 1, compared to the group 2. It is possible to easily analyze whether the object for each group is included in the frame and the weight thereof by the method described above.

FIG. 10 is a diagram for illustrating the frame extraction operation according to an embodiment.

The counting value normalized for each group obtained in FIG. 9(*c*) may be obtained for each frame. As the values (10, 0, 0) of the frame 1, only the group 1 may have the normalized counting value. However, as the values (10, 5, 0) of the frame 2, both the group 1 and the group 2 may have the normalized counting value. Herein, the electronic device 100 may identify one representative group for each frame. For example, in the frame 1, the group 1 may be identified as the representative group with no worry. In the frame 2, the value of group 1 is 10 and the value of group 2 is 5, and accordingly, the group 1 may be identified as the representative group. This method may be a method for selecting a maximum value among the values of each group. The electronic device 100 may identify the highest value among the normalized counting values of each group and may identify the group having the highest value as the representative group of the corresponding frame.

The electronic device 100 may identify the representative group of each frame based on the normalized counting value and store which frame has which representative group for all of the frames in the memory. When the representative group is identified for each frame, the user may select the frame for each group, and accordingly, it is easy to perform the analysis for each frame.

When the user selects the group 1 and inputs a command for generating the summary content, the electronic device 100 may extract frames with the group 1 as the representative group. Referring to FIG. 10, when the user selects the group 1, the electronic device 100 may extract the frame 1 and the frame 2 that have the group 1 as the representative group. The electronic device 100 may connect the frame 1 and the frame 2 to generate the summary content.

FIG. 11 is a diagram for illustrating the frame extraction method according to another embodiment of the disclosure.

The counting value normalized for each group obtained in FIG. 9(c) may be obtained for each frame. As the values (10, 0, 0) of the frame 1, only the group 1 may have the normalized counting value. However, as the values (10, 5, 0) of the frame 2, both the group 1 and the group 2 may have the normalized counting value.

The electronic device 100 may extract frames by applying different weights for each group. For example, it is assumed that the user prefers the group 1 most and the group 2 secondly. The electronic device 100 may set a weight of 0.7 for the group 1, a weight of 0.2 for the group 2, and a weight of 0.1 for a group 3. The electronic device 100 may apply the weight corresponding to each group for each frame. It is assumed that the value after applying the weight may refer to a final value, for convenience.

The electronic device 100 may apply the weight for each group to the normalized counting value and obtain the final value for each frame. Herein, the final value obtained for each frame may be a numerical value obtained by reflecting preferred groups of the user.

The electronic device 100 may extract a frame with a value equal to or greater than the predetermined threshold value using the final value. For example, the electronic device 100 may extract a frame with the final value equal to or greater than 6. Referring to FIG. 11, the electronic device 100 may extract the frame 1, the frame 2, and the frame 4 which are frames with the final value equal to or greater than 6. The electronic device 100 may connect the frame 1, the frame 2, and the frame 4 to generate one summary content.

The predetermined threshold value, 6, in the above description may be changed according to the user's setting or selection. It is assumed that the predetermined threshold value is set as 6. The electronic device 100 may adjust the predetermined threshold value in response to the summary content time desired by the user. For example, if the time of the extracted and connected frames is 5 minutes, while the time of the summary content desired by the user is 10 minutes, the electronic device 100 may increase the number of extracted frames by decreasing the predetermined threshold value. On the other hand, if the time of the extracted and connected frames is 15 minutes, while the time of the summary content desired by the user is 10 minutes, the electronic device 100 may reduce the number of extracted frames by increasing the predetermined threshold value.

The electronic device 100 may automatically identify the operation of extracting the number of frames corresponding to the time of the summary content desired by the user. Specifically, the electronic device 100 may identify a most appropriate predetermined threshold value by analyzing the number of frames obtained by changing the predetermined threshold value and the electronic device 100 may extract the frames using the most appropriate predetermined threshold value. The electronic device 100 may generate the summary content in response to the time of the summary content desired by the user.

When the weight for each group is applied, the electronic device 100 may reflect the preference of the user more specifically. In addition, the electronic device 100 may reflect importance of not only any one group, but also various groups, thereby increasing satisfaction with respect to the summary content.

Figure 12:
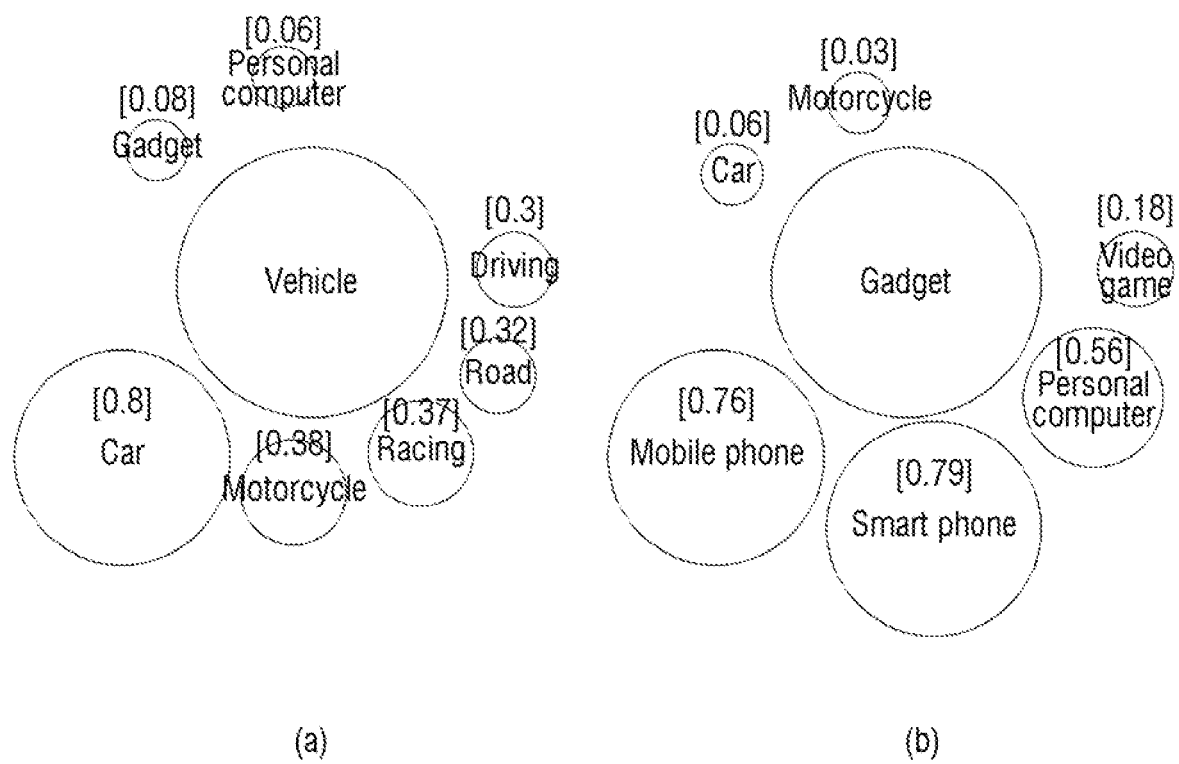
FIG. 12 is a diagram for illustrating an operation of grouping a plurality of objects and a representative object of the groups.

FIG. 12 is a diagram for illustrating an operation of grouping a plurality of objects and a representative object of the groups.

The electronic device 100 may identify one group by using the correlation value (relation value) between the objects. For example, the electronic device 100 may analyze the correlation value (relation value) between the vehicle, car, motor cycle, racing, road, and driving objects to set the objects as one group. The group setting method has been described with reference to FIG. 8. Referring to FIG. 12, the electronic device 100 may group the cases where the correlation value (relation value) is equal to or greater than the predetermined threshold value into one group and group the vehicle, car, motor cycle, racing, road, and driving objects into one group.

In addition, the electronic device 100 may identify the representative object among the vehicle, car, motor cycle, racing, road, and driving objects. A criterion for identifying the representative object is a highest average of probability values of the object in the same group. In addition, the electronic device 100 may identify an object having a large number of probability values equal to or greater than the predetermined threshold value as the representative object. The electronic device 100 may identify the vehicle object as the representative object.

In the same manner, the electronic device 100 may analyze the correlation value (relation value)s between the gadget, mobile phone, smart phone, personal computer, and video game objects and set the objects as one group. Referring to FIG. 12, the electronic device 100 may group the cases where the correlation value (relation value) is equal to or greater than the predetermined threshold value into one group and group the gadget, mobile phone, smart phone, personal computer, and video game objects into one group.

In addition, the electronic device 100 may identify the representative object among the gadget, mobile phone, smart phone, personal computer, and video game objects. A criterion for identifying the representative object is a highest average of probability values of the object in the same group. In addition, the electronic device 100 may identify an object having a large number of probability values equal to or greater than the predetermined threshold value as the representative object. The electronic device 100 may identify the gadget object as the representative object.

The specific method for identifying the representative object has been described with reference to FIG. 12, but the method for identifying the representative object is not limited to the method described above, and various methods for selecting an object which may represent the same group may be applied.

Figure 13:
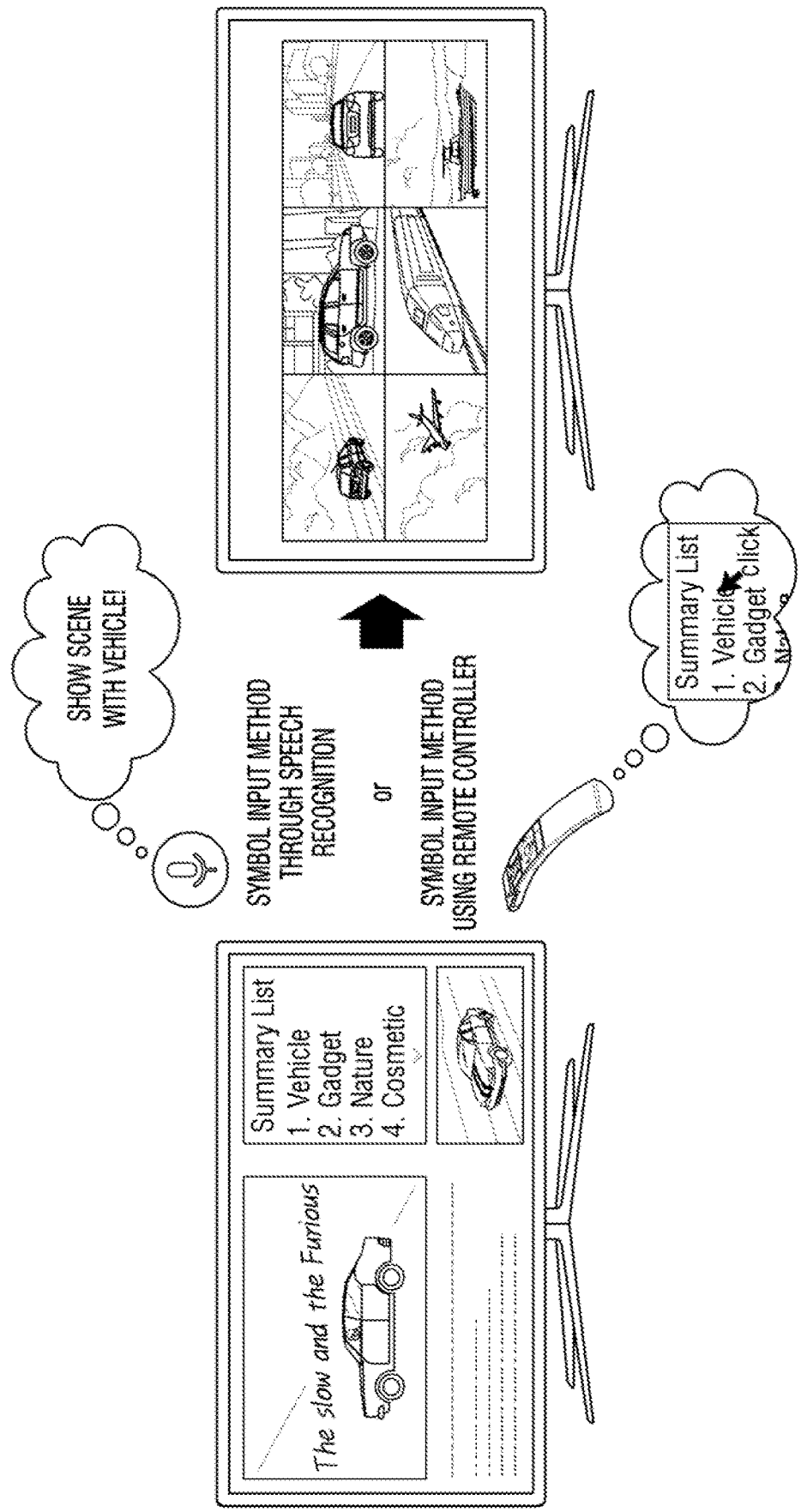
FIG. 13 is a diagram for illustrating a user interface displayed on a display.

FIG. 13 is a diagram for illustrating a user interface displayed on a display.

The electronic device 100 may display a user interface on the display. The display may be a hardware element included in the electronic device 100 and may be a display device connected separately.

The electronic device 100 may display a user interface for generating the summary content to the user and the user interface may display a group object which is a criterion of the summary content. As described above, the electronic device 100 may group the plurality of objects into one group based on the interrelationship.

The electronic device 100 may display a user interface for inquiring of the user which group is to be selected on the display. For example, the user interface may display the number of group, the name of group, or the representative object. Referring to FIG. 13, the representative objects are displayed and the vehicle, gadget, nature, and cosmetic may be the representative objects.

Various method may be used to select the groups displayed on the user interface. The electronic device 100 may select the group through speech recognition. For example, when the user utters a voice of "Show scene with vehicle!", the electronic device 100 may select the vehicle group. Alternatively, the user may select the group using the remote controller directly.

When the specific group is selected by the user, the electronic device 100 may generate the summary content based on the frames related to the corresponding group. Even if the user selects the specific group, the corresponding group may already include various related objects. Accordingly, when the user selects the representative object, the electronic device 100 may set frames of the various related objects as the target of the summary content.

Figure 14:
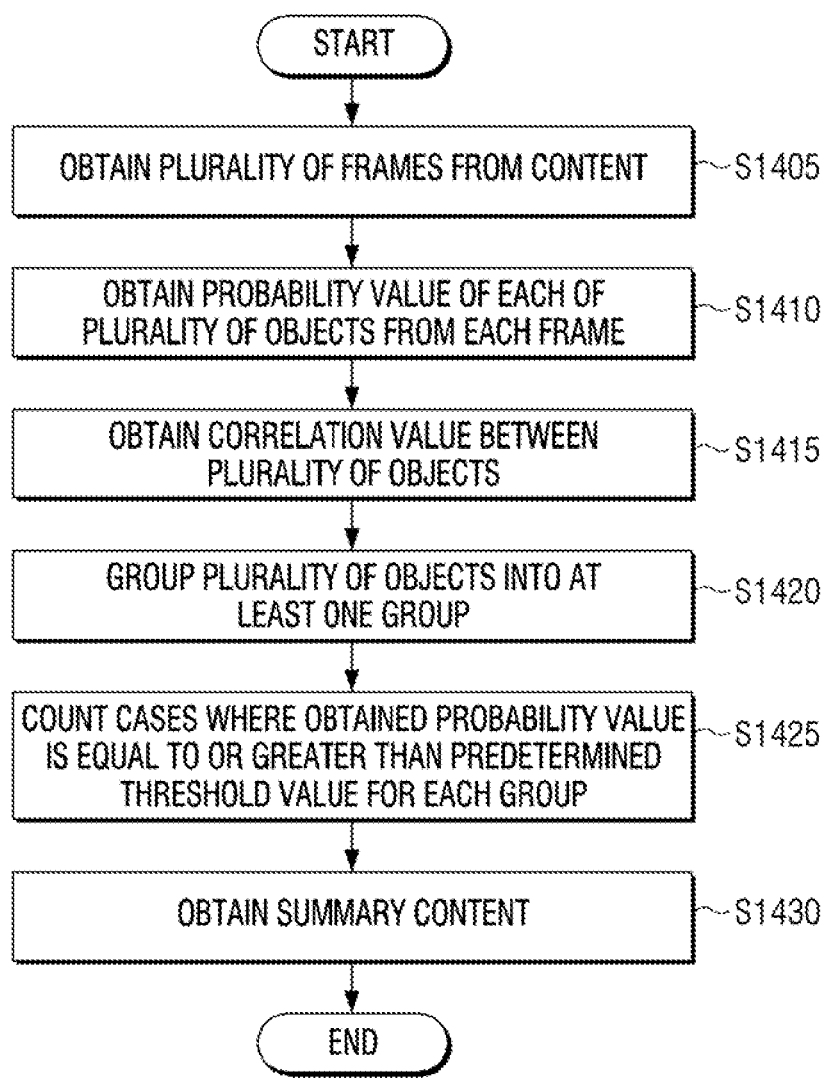
FIG. 14 is a flowchart for illustrating a method for controlling an electronic device according to an embodiment.

FIG. 14 is a flowchart for illustrating a method for controlling the electronic device 100 according to an embodiment.

In the method for controlling the electronic device 100 storing the content according to an embodiment of the disclosure, the plurality of frames are obtained from the content (S1405). The probability value for each of the plurality of objects may be obtained from each of the plurality of frames (S1410). The correlation value between the plurality of objects may be obtained based on the obtained probability value (S1415). The plurality of objects may be grouped into at least one group based on the obtained correlation value (S1420). The cases where the obtained probability value is equal to or greater than the predetermined threshold value may be counted for each of the plurality of frames for each group (S1425). The summary content may be obtained based on the counted result (S1430).

Herein, in the obtaining the correlation value (S1415), the correlation value between the plurality of objects may be obtained by comparing a difference between the probability values between the plurality of objects for each of the plurality of frames, and in the grouping (S1420), the objects having the obtained correlation value equal to or greater than the predetermined threshold value may be grouped into one group.

In the obtaining the summary content (S1430), a main frame for each group may be obtained based on the counted result, and the summary content may be obtained based on the main frame included in the predetermined group.

The control method may further include identifying the representative object among the objects belonging to each group, and providing information regarding the identified representative object, and in the obtaining the summary content, when the information regarding the specific object is selected by the user, the summary content obtained based on the main frame of the group of the specific object may be obtained.

The control method may further include counting the cases where the probability value obtained for each of the plurality of frames is equal to or greater than the predetermined threshold value for each object, and in the obtaining the summary content, the summary content may be obtained by identifying the object, the number of times of counting of which for each object is equal to or greater than the predetermined threshold value.

The control method may further include normalizing a counted result for each group based on the number of objects belonging to each group.

The control method may further include applying a weight for each group to the normalized value for each group regarding each of the plurality of frames, and in the obtaining the summary content, the summary content may be obtained based on a value applied with the weight.

In the obtaining the summary content (S1430), a size of the predetermined threshold value may be adjusted based on a play time of the summary content input in accordance with a user command.

The control method may further include, when the play time of the summary content input in accordance with the user command is longer than a play time of the obtained summary content, updating the summary content by adding frames within a predetermined play time range based on a play point of the summary content.

The method for controlling the electronic device as illustrated in FIG. 14 may be executed on the electronic device having the configuration of FIG. 1 or FIG. 2 and may be executed on an electronic device having other configurations.

The method for controlling the electronic device according to the embodiment may be implemented as a program and provided to the electronic device. Particularly, the program including the method for controlling the electronic device may be stored in and provided to a non-transitory computer readable medium.

In a non-transitory computer readable recording medium storing a computer instruction executed by the processor 120 of the electronic device storing a content to enable the electronic device to perform an operation, the operation includes obtaining a plurality of frames from the content, obtaining a probability value of each of a plurality of objects included in each of the plurality of frames, obtaining a correlation value between the plurality of objects based on the obtained probability value, grouping the plurality of objects into at least one group based on the obtained correlation value, counting cases where the obtained probability value is equal to or greater than a predetermined threshold value for each of the plurality of frames for each group, and obtaining a summary content based on the counted result.

The methods according to the embodiments of the disclosure described above may be implemented in a form of an application installable in the electronic device of the related art.

In addition, the methods according to the embodiments of the disclosure described above may be implemented simply by the software upgrade or hardware upgrade in the electronic device of the related art.

Further, the embodiments of the disclosure described above may be performed through an embedded server provided in the electronic device or an external server of the electronic device.

The method for controlling the electronic device according to the embodiment may be implemented as a program and provided to the electronic device. Particularly, the program including the method for controlling the electronic device may be stored in and provided to a non-transitory computer readable medium.

The embodiments described above may be implemented in a recording medium readable by a computer or a similar device using software, hardware, or a combination thereof. According to the implementation in terms of hardware, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions. In some cases, the embodiments described in this specification may be implemented as the processor 120 itself. According to the implementation in terms of software, the embodiments such as procedures and functions described in this specification may be implemented as separate software modules. Each of the software modules may perform one or more functions and operations described in this specification.

Computer instructions for executing processing operations on the electronic device according to the embodiments of the disclosure descried above may be stored in a non-transitory computer-readable medium. When the computer instructions stored in such a non-transitory computer-readable medium are executed by the processor of a specific machine, the computer instructions may enable the specific machine to execute the processing operations on the electronic device according to the embodiments described above.

The non-transitory computer-readable medium is not a medium storing data for a short period of time such as a register, a cache, or a memory, but means a medium that semi-permanently stores data and is readable by a machine. Specific examples of the non-transitory computer-readable medium may include a CD, a DVD, a hard disk drive, a Blu-ray disc, a USB, a memory card, and a ROM.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
a memory storing a content; and
a processor configured to:
obtain a probability value of each of a plurality of objects included in each of a plurality of frames configuring the stored content;
group the plurality of objects into at least one group in accordance with a correlation value between the plurality of objects based on the obtained probability value; and
count cases where the obtained probability value is equal to or greater than a predetermined threshold value for each of the plurality of frames for each group, and obtain a summary content based on the counted result.

2. The device according to claim 1, wherein the processor is configured to:
obtain the correlation value between the plurality of objects by comparing a difference of the probability values between the plurality of objects for each of the plurality of frames; and
group objects having the obtained correlation value equal to or greater than a predetermined threshold value into one group.

3. The device according to claim 1, wherein the processor is configured to:
obtain a main frame for each group based on the counted result and obtain the summary content based on the main frame included in the predetermined group.

4. The device according to claim 3, further comprising:
a display,
wherein the processor is configured to:
identify a representative object among objects belonging to each group;
control the display to provide information regarding the identified representative object, and based on information regarding a specific object being selected by a user, provide a summary content obtained based on a main frame of a group of the specific object.

5. The device according to claim 1, wherein the processor is configured to:
count the cases where the obtained probability value is equal to or greater than the predetermined threshold value for each of the plurality of frames for each object, and obtain the summary content by identifying objects, the number of times of counting of which for each object is equal to or greater than a predetermined threshold value.

6. The device according to claim 1, wherein the processor is configured to normalize the counted result for each group based on the number of objects belonging to each group.

7. The device according to claim 6, wherein the processor is configured to apply a weight for each group to the normalized value for each group regarding each of the plurality of frames, and obtain the summary content based on a value applied with the weight.

8. The device according to claim 1, wherein the processor is configured to adjust a size of the predetermined threshold value based on a play time of a summary content input in accordance with a user command.

9. The device according to claim 1, wherein the processor is configured to, based on a play time of a summary content input in accordance with a user command being longer than a play time of the obtained summary content, update the summary content by adding frames within a predetermined play time range based on a play point of the summary content.

10. A method for controlling an electronic device storing a content, the method comprising:
obtaining a probability value of each of a plurality of objects included in each of a plurality of frames configuring the stored content;
grouping the plurality of objects into at least one group in accordance with a correlation value between the plurality of objects based on the obtained probability value;
counting cases where the obtained probability value is equal to or greater than a predetermined threshold value for each of the plurality of frames for each group; and
obtaining a summary content based on the counted result.

11. The method according to claim 10, wherein the obtaining the correlation value comprises obtaining the correlation value between the plurality of objects by comparing a difference of the probability values between the plurality of objects for each of the plurality of frames, and wherein the grouping comprises grouping objects having the obtained correlation value equal to or greater than a predetermined threshold value into one group.

12. The method according to claim 10, wherein the obtaining the summary content comprises obtaining a main frame for each group based on the counted result and obtaining the summary content based on the main frame included in the predetermined group.

13. The method according to claim 12, further comprising:

identifying a representative object among objects belonging to each group; and providing information regarding the identified representative object, wherein the obtaining the summary content comprises, based on information regarding a specific object being selected by a user, obtaining a summary content obtained based on a main frame of a group of the specific object.

14. The method according to claim 10, further comprising:

counting the cases where the obtained probability value is equal to or greater than the predetermined threshold value for each of the plurality of frames for each object, wherein the obtaining the summary content comprises obtaining the summary content by identifying objects, the number of times of counting of which for each object is equal to or greater than a predetermined threshold value.

15. A non-transitory computer readable recording medium storing a computer instruction executable by a processor of an electronic device storing a content to enable the electronic device to perform an operation, wherein the operation comprises:

obtaining a plurality of frames from the content;

obtaining a probability value of each of a plurality of objects included in each of the plurality of frames configuring the stored content;

grouping the plurality of objects into at least one group in accordance with a correlation value between the plurality of objects based on the obtained probability value;

counting cases where the obtained probability value is equal to or greater than a predetermined threshold value for each of the plurality of frames for each group; and obtaining a summary content based on the counted result.

* * * * *